(12) United States Patent
Lee et al.

(10) Patent No.: US 10,965,415 B2
(45) Date of Patent: Mar. 30, 2021

(54) METHOD FOR ASSIGNING PTRS FOR PHASE NOISE REMOVAL IN WIRELESS COMMUNICATION SYSTEM, AND DEVICE THEREFOR

(71) Applicant: LG ELECTRONICS INC., Seoul (KR)

(72) Inventors: Kilbom Lee, Seoul (KR); Jiwon Kang, Seoul (KR); Kyuseok Kim, Seoul (KR); Kijun Kim, Seoul (KR); Kunil Yum, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 61 days.

(21) Appl. No.: 16/497,776

(22) PCT Filed: Mar. 23, 2018

(86) PCT No.: PCT/KR2018/003461
§ 371 (c)(1),
(2) Date: Sep. 25, 2019

(87) PCT Pub. No.: WO2018/182244
PCT Pub. Date: Oct. 4, 2018

(65) Prior Publication Data
US 2020/0389270 A1 Dec. 10, 2020

Related U.S. Application Data

(60) Provisional application No. 62/476,744, filed on Mar. 25, 2017, provisional application No. 62/518,566, (Continued)

(51) Int. Cl.
*H04L 5/00* (2006.01)
*H04W 72/04* (2009.01)

(52) U.S. Cl.
CPC ....... *H04L 5/0048* (2013.01); *H04W 72/0406* (2013.01)

(58) Field of Classification Search
CPC ..... H04L 5/0048; H04L 5/00; H04W 72/0406
See application file for complete search history.

(56) References Cited

U.S. PATENT DOCUMENTS

2012/0201163 A1* 8/2012 Jongren ............... H04W 24/10
370/252
2013/0229989 A1 9/2013 Natarajan et al.
(Continued)

FOREIGN PATENT DOCUMENTS

| EP | 2346201 | 7/2011 |
|---|---|---|
| KR | 101554804 | 9/2015 |
| KR | 101577518 | 12/2015 |

OTHER PUBLICATIONS

Ericsson, On DL PTRS design, May 15,2017, 3GPP TSG-RAN WG1 #89, R1-1708707. (Year: 2017).*
(Continued)

*Primary Examiner* — Tejis Daya
(74) *Attorney, Agent, or Firm* — Lee, Hong, Degerman, Kang & Waimey

(57) ABSTRACT

A method for a base station to transmit a signal allowing a terminal to remove phase noise in an mmWave communication system, according to an embodiment of the present specification, may be provided. Here, the method for transmitting a signal for removing phase noise comprises: a step of generating a phase tracking reference signal (PTRS) and a first RS; a step of assigning the PTRS and the first RS to a resource block; and a step of transmitting the assigned PTRS and first RS, wherein the step of assigning the PTRS and the first RS includes a step of changing a frequency location of the PTRS if the PTRS and the first RS collide in the resource block, wherein the changed PTRS frequency (Continued)

location may be changed to a frequency location, across frequencies on which a predetermined demodulation reference signal (DMRS) port, associated with the PTRS, in a DMRS port group is located, which is closest to the existing PTRS frequency location and avoids collision with the first RS.

8 Claims, 18 Drawing Sheets

Related U.S. Application Data filed on Jun. 12, 2017, provisional application No. 62/520,666, filed on Jun. 16, 2017.

(56) References Cited

U.S. PATENT DOCUMENTS

| | | | |
|---|---|---|---|
| 2016/0286404 A1* | 9/2016 | Rico Alvarino | H04L 5/001 |
| 2018/0368013 A1* | 12/2018 | Yoo | H04L 5/0048 |
| 2019/0260466 A1* | 8/2019 | Bai | H04B 7/2603 |
| 2020/0244415 A1* | 7/2020 | Liu | H04B 7/0632 |

OTHER PUBLICATIONS

Nokia, Alcatel-Lucent Shanghai Bell, On PT-RS Design for NR, Feb. 13, 2017, 3GPP TSG RAN WG1#88, R1-1703182. (Year: 2017).*

ZTE, Discussion on RS for phase tracking, May 14, 2017, 3GPP TSG RAN WG1 Meeting #89, R1-1707132. (Year: 2017).*

PCT International Application No. PCT/KR2018/003461, Written Opinion of the International Searching Authority dated Jun. 20, 2018, 17 pages.

Korean Intellectual Property Office Application No. 10-2019-7024985, Notice of Allowance dated Nov. 8, 2019, 3 pages.

Ericsson, "On PTRS design", 3GPP TSG RAN WG1 Meeting #88, R1-1703220, Feb. 2017, 4 pages.

Ericsson, "On DL and UL phase noise tracking RS (PTRS)", 3GPP TSG RAN WG1 Meeting #87 ah-NR, R1-1701161, Jan. 2017, 10 pages.

LG Electronics, "Discussion on Phase Tracking RS for UL transmission", 3GPP TSG RAN WG1 Meeting #87, R1-1611810, Nov. 2016, 5 pages.

Zte et al., "Discussion on RS for phase tracking", 3GPP TSG RAN WG1 Meeting #88, R1-1701817, Feb. 2017, 9 pages.

Ericsson, "Design considerations for phase noise tracking RS (PTRS)", 3GPP TSG RAN WG1 Meeting #87, R1-1612333, Nov. 2016, 4 pages.

LG Electronics, "Reference Signal for Frequency offset and Phase Tracking", 3GPP TSG RAN WG1 Meeting #87, R1-1611809, Nov. 2016, 7 pages.

3rd Generation Partnership Project (3GPP), "Technical Specification Group Radio Access Network; Study on New Radio Access Technology Physical Layer Aspects (Release 14)," 3GPP TR 38.802 V14.0.0, Mar. 2017, 144 pages.

* cited by examiner

Pattern #1

Pattern #2

Pattern #3

Pattern #4

METHOD FOR ASSIGNING PTRS FOR PHASE NOISE REMOVAL IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2018/003461, filed on Mar. 23, 2018, which claims the benefit of U.S. Provisional Application No. 62/476,744, filed on Mar. 25, 2017, 62/518,566, filed on Jun. 12, 2017, and 62/520,666, filed on Jun. 16, 2017, the contents of which are all hereby incorporated by reference herein in their entireties.

TECHNICAL FIELD

The present disclosure relates to a wireless communication system, and more particularly, to a method of allocating a phase tracking reference signal (PTRS) for phase noise cancellation in a wireless communication system and device therefor.

BACKGROUND ART

An ultra-high frequency radio communication system using a millimeter wave (mmWave) is configured to operate at a center frequency in the range of several GHz to several tens of GHz. Due to such a center frequency feature, significant path loss may occur in a shadow area in the mmWave communication system. Considering that a synchronization signal should be stably transmitted to all terminals within the coverage of a base station, the synchronization signal needs to be designed and transmitted in consideration of the potential deep-null phenomenon, which may occur due to the above-described ultra-high frequency band characteristic, in the mmWave communication system.

DISCLOSURE

Technical Problem

The present disclosure is contrived to solve the aforementioned problems. Accordingly, an object of the present disclosure is to provide a PTRS allocation method.

Another object of the present disclosure is to improve a phase noise cancellation procedure for a user equipment (UE) in a wireless communication system to accurately decode a received signal.

A further object of the present disclosure is to provide a method of improving the efficiency of signal transmission for phase noise cancellation.

Still another object of the present disclosure is to improve receiving-side operation by providing information on signal transmission for phase noise cancellation.

Still a further object of the present disclosure is to provide a method of transmitting a signal for phase noise cancellation by considering phase noise compensation and reference signal overhead.

Technical Solution

In an aspect of the present disclosure, provided herein is a method of transmitting, by a base station, a signal for enabling a user equipment (UE) to eliminate phase noise in a millimeter wave (mmWave) communication system. The method may include: generating a phase tracking reference signal (PTRS) and a first reference signal (RS); allocating the PTRS and the first RS to a resource block; and transmitting the allocated PTRS and first RS. Allocating the PTRS and the first RS may include, when the PTRS collides with the first RS in the resource block, shifting a frequency location of the PTRS. The shifted PTRS frequency location may correspond to a frequency location capable of avoiding the collision with the first RS and closest to the current PTRS frequency location among frequency locations at which a specific demodulation reference signal (DMRS) port in a DMRS port group associated with the PTRS is positioned.

In another aspect of the present disclosure, provided herein is a base station for transmitting a signal for enabling a UE to eliminate phase noise in a mmWave communication system. The base station may include: a receiver configured to receive a signal from an external device; a transmitter configured to transmit a signal to an external device; and a processor configured to control the receiver and the transmitter. The processor may be configured to: generate a PTRS and a first RS; allocate the PTRS and the first RS to a resource block; and transmit the allocated PTRS and first RS. When the PTRS and the first RS are allocated, if the PTRS collides with the first RS in the resource block, the processor may be configured to shift a frequency location of the PTRS. The shifted PTRS frequency location may correspond to a frequency location capable of avoiding the collision with the first RS and closest to the current PTRS frequency location among frequency locations at which a specific DMRS port in a DMRS port group associated with the PTRS is positioned.

The followings are commonly applicable to the method and device for transmitting a signal for phase noise cancellation in a mmWave communication system.

When the PTRS and the first RS are allocated to a plurality of resource blocks, shifting the frequency location of the PTRS may be performed independently in each of the plurality of resource blocks.

The specific DMRS port may be equal to a DMRS port in the DMRS port group associated with the PTRS.

The specific DMRs port may correspond to any one of at least one DMRS port included in the DMRS port group associated with the PTRS.

The first RS may include at least any one of a channel state information-reference signal (CSI-RS), a sounding reference signal (SRS), and a tracking RS. The shifted PTRS frequency location may be indicated by at least any one of radio resource control (RRC), a medium access control-control element (MAC-CE), and downlink control information (DCI).

When a frequency location capable of avoiding the collision with the first RS is not found among frequency locations at which DMRS ports in the DMRS port group associated with the PTRS are positioned, the PTRS may be positioned at a frequency location capable of avoiding the collision among frequency locations closest to the current PTRS frequency location.

When the PTRS collides with the first RS in the resource block, the frequency location of the PTRS may be fixed and a time-domain location thereof may be shifted.

Only when the PTRS is allocated at an interval of at least one orthogonal frequency-division multiplexing (OFDM) symbol at one frequency, the frequency location of the PTRS may be fixed and the time-domain location thereof may be shifted.

When the frequency location capable of avoiding the collision with the first RS is not found among the frequency locations at which the DMRS ports in the DMRS port group associated with the PTRS are positioned, if the PTRS is allocated at an interval of at least one OFDM symbol at one frequency, the frequency location of the PTRS may be fixed and the time-domain location thereof may be shifted. In addition, when the frequency location capable of avoiding the collision with the first RS is not found among the frequency locations at which the DMRS ports in the DMRS port group associated with the PTRS are positioned, if the PTRS is allocated to all OFDM symbols at one frequency, the frequency location of the PTRS may be shifted to the frequency location capable of avoiding the collision among the frequency locations closest to the current PTRS frequency location.

When the frequency location capable of avoiding the collision with the first RS is not found among the frequency locations at which the DMRS ports in the DMRS port group associated with the PTRS are positioned, the frequency location of the PTRS may be fixed and the time-domain location thereof may be shifted. If the collision with the first RS is still unavoidable after shifting of the time-domain location, the frequency location of the PTRS may be shifted to the frequency location capable of avoiding the collision among the frequency locations closest to the current PTRS frequency location.

Advantageous Effects

According to the present disclosure, a received signal can be accurately decoded by improving a phase noise cancellation procedure for a UE in a wireless communication system.

According to the present disclosure, a method of improving the efficiency of signal transmission for phase noise cancellation can be provided.

According to the present disclosure, receiving-side operation can be improved by providing information on signal transmission for phase noise cancellation.

According to the present disclosure, a PTRS allocation method can be provided.

According to the present disclosure, a method of transmitting a signal for phase noise cancellation by considering compensation for phase noise and reference signal overhead can be provided.

It will be appreciated by persons skilled in the art that the effects that could be achieved with the present disclosure are not limited to what has been particularly described hereinabove and other advantages of the present disclosure will be more clearly understood from the following detailed description.

BEST MODE

Figure 1:
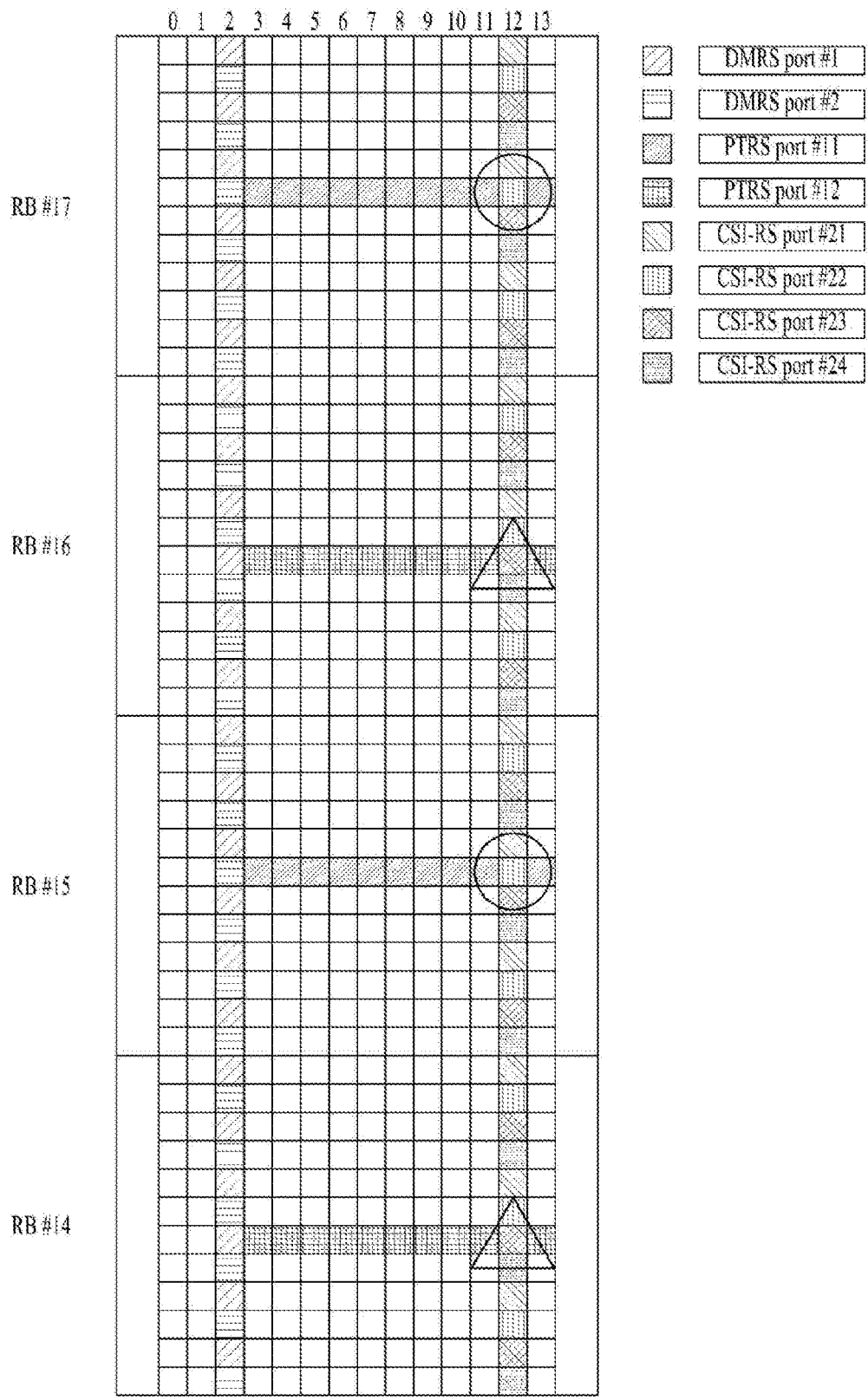
FIG. 1 is a diagram illustrating a PTRS allocation method when a PTRS collides with a CSI-RS.

Although the terms used in the present disclosure are selected from generally known and used terms, terms used herein may vary depending on operator's intention or customs in the art, appearance of new technology, or the like. In addition, some of the terms mentioned in the description of the present disclosure have been selected by the applicant at his or her discretion, the detailed meanings of which are described in relevant parts of the description herein. Furthermore, it is required that the present disclosure is understood, not simply by the actual terms used but by the meanings of each term lying within.

The following embodiments are proposed by combining constituent components and characteristics of the present disclosure according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present disclosure. The order of operations to be disclosed in the embodiments of the present disclosure may be changed. Some components or characteristics of any embodiment may also be included in other embodiments or may be replaced with those of the other embodiments as necessary.

In describing the present disclosure, if it is determined that the detailed description of a related known function or construction renders the scope of the present disclosure unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present disclosure (particularly, the context of the following claims) clearly indicates otherwise.

In this document, the embodiments of the present disclosure have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro base station supporting the macro cell" and/or a "small cell base station supporting the small cell".

The embodiments of the present disclosure can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present disclosure clear, may be supported by the above documents.

In addition, all the terms disclosed in the present document may be described by the above standard documents. In particular, the embodiments of the present disclosure may be supported by at least one of P802.16-2004, P802.16e-2005, P802.16.1, P802.16p and P802.16.1b documents, which are the standard documents of the IEEE 802.16 system.

Hereinafter, the preferred embodiments of the present disclosure will be described with reference to the accompanying drawings. It is to be understood that the detailed description which will be disclosed along with the accompanying drawings is intended to describe the exemplary embodiments of the present disclosure and is not intended to describe a unique embodiment which the present disclosure can be carried out.

It should be noted that specific terms disclosed in the present disclosure are proposed for convenience of description and better understanding of the present disclosure, and the use of these specific terms may be changed to another format within the technical scope or spirit of the present disclosure.

Proposal 1 (Frequency Interval Between PTRSs)

FIG. 1 is a diagram illustrating a resource block to which a demodulation reference signal (DMRS), a PTRS, and a channel state information reference signal (CSI-RS) are allocated. It may be defined that the PTRS is allocated in the time domain and the CSI-RS is allocated in the frequency domain. For example, a collision between the PTRS and the CSI-RS may occur in a specific resource element. In particular, when data is transmitted in an orthogonal frequency-division multiplexing (OFDM) symbol where CSI-RS transmission is reserved, the phase noise in the corresponding OFDM symbol may need to be estimated. When the PTRS collides with the CSI-RS, a method of handing such a collision may be required for phase noise estimation. Hereinafter, the method will be described.

If no CSI-RS is defined in a PTRS region, a base station needs to inform all UEs, which use the CSI-RS, that no CSI-RS is defined in the PTRS region. However, this operation may cause signaling overhead. That is, it may not be desirable in terms of signaling overhead. On the other hand, when no PTRS is defined in a CSI-RS region, phase noise estimation performance may be degraded. Thus, it may be necessary to transmit the CSI-RS and the PTRS simultaneously. In the case of a UE that receives the CSI-RS, the UE may regard the PTRS as interference. This interference problem may be solved by CSI-RS boosting. In addition, the CSI-RS may act as interference from the perspective of the PTRS.

FIG. 1 shows that when the interval between PTRSs in the frequency domain is fixed, the PTRS collides with a specific CSI-RS port. For example, PTRS port #11 may collide with CSI-RS port #22 at all times.

Figure 2:
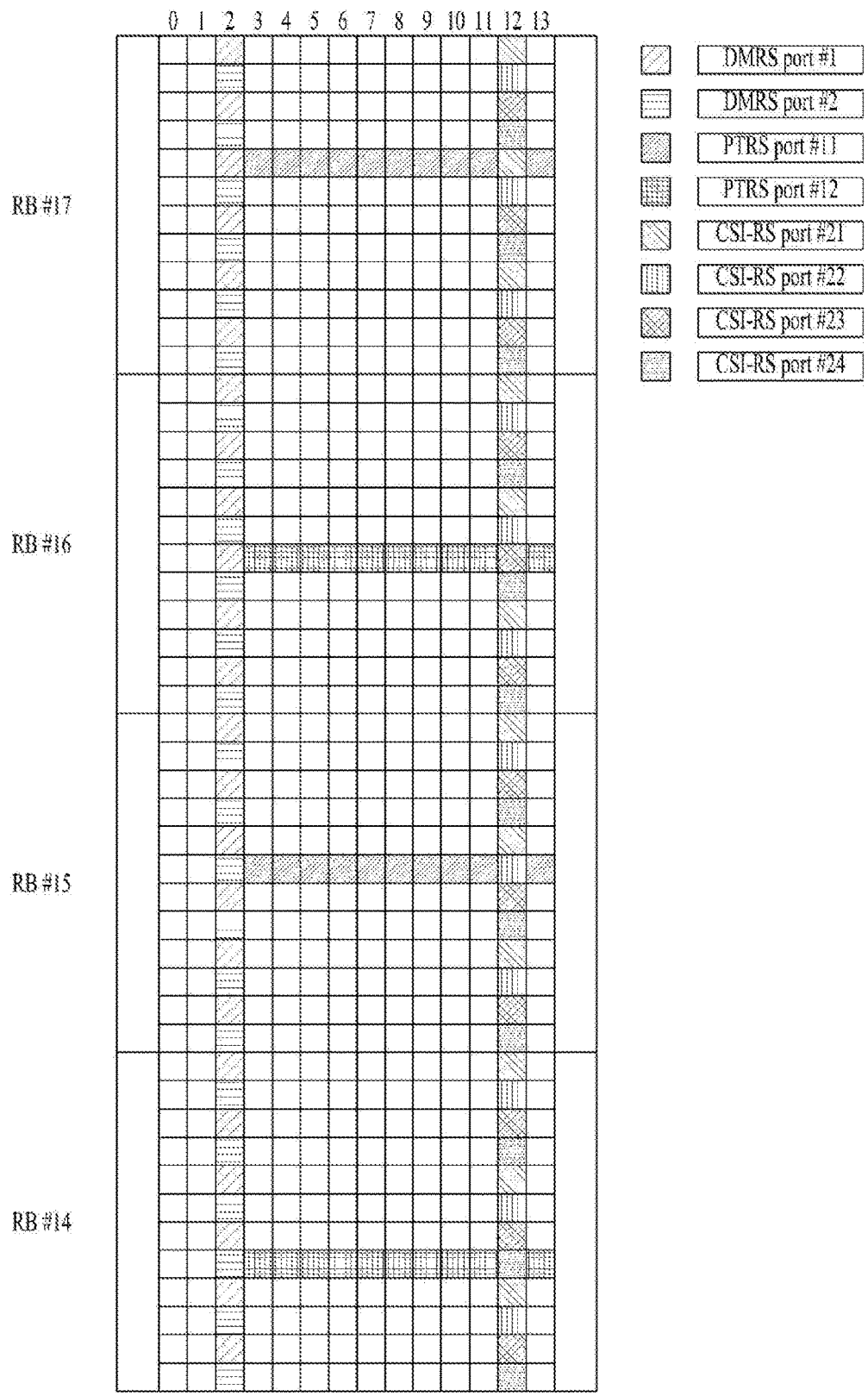
FIG. 2 is a diagram illustrating a PTRS allocation method when a PTRS collides with a CSI-RS.

To solve this problem, the interval between PTRS ports may be irregular as shown in FIG. 2. More specifically, PTRS port #11 may collide with CSI-RS port #22 in RB #15. In this case, since the PTRS frequency interval is irregular, PTRS port #11 may collide with CSI-RS port #21 in RB #17. That is, collisions may no longer occur between the same ports. That is, it is possible to solve the problem caused when a collision occurs at a specific port.

Proposal 1-1 (Frequency Interval Between PTRSs)

Figure 3:
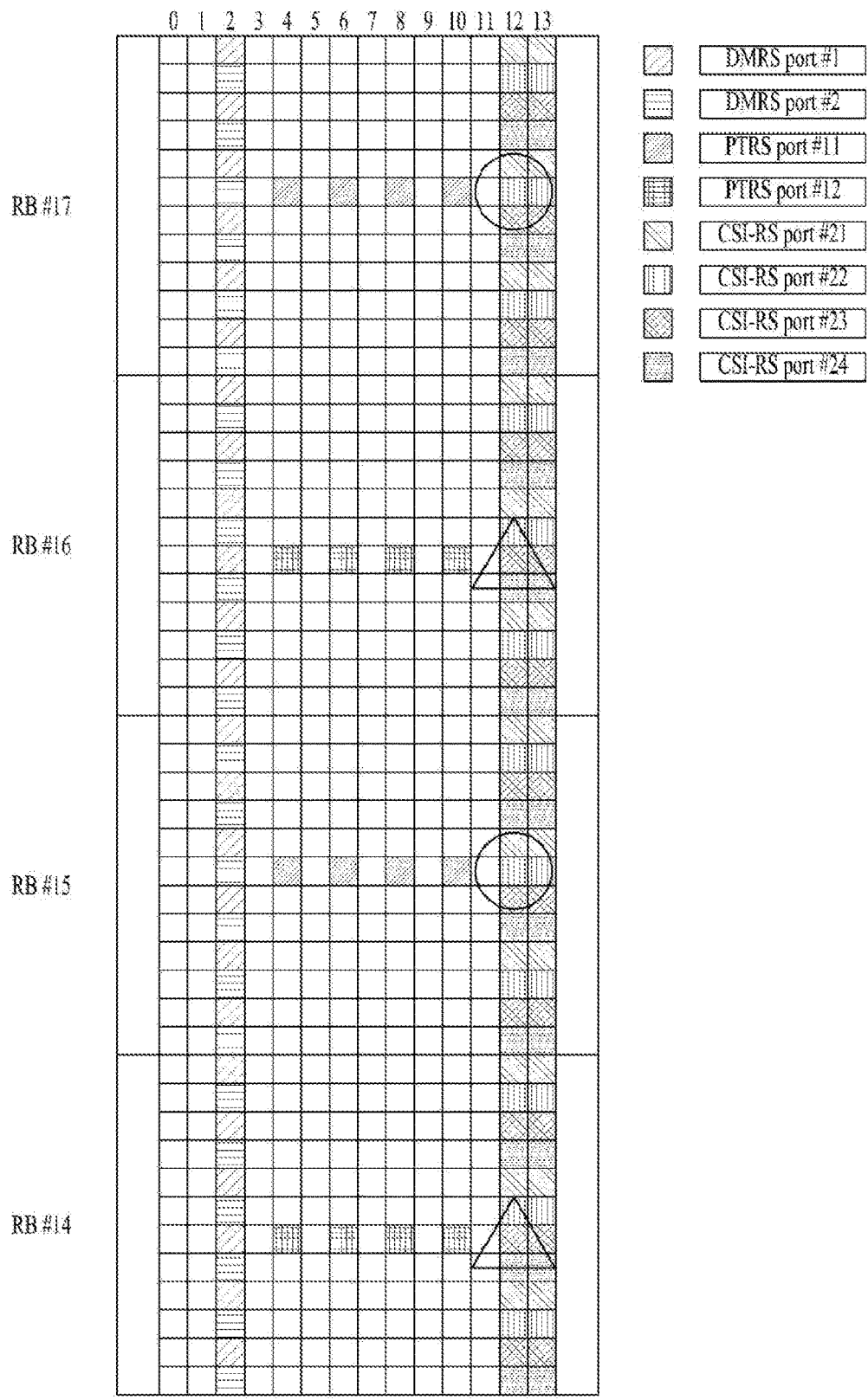
FIG. 3 is a diagram illustrating a PTRS allocation method when a PTRS collides with a CSI-RS.

Referring to FIG. 3 CSI ports #21 to #24 are defined in the 13th OFDM symbol, and CSI ports #25 to #28 are defined in the 14th OFDM symbol. In FIG. 3, a PTRS may be located at an interval of one OFDM symbol at the same frequency. Although PTRS pattern #2 is assumed, the present disclosure is not limited thereto. The location of the PTRS may be fixed or changed for each frequency. For example, referring to FIG. 3, it can be seen that the PTRS pattern in RB #15 is different from the PTRS pattern in RB #17. In FIG. 3, each CSI-RS port collides with a PTRS port only once. For example, PTRS port #11 collides with each of CSI-RS ports #21 and #25 only once.

Meanwhile, using both the time-domain location of the PTRS and the PTRS interval in the frequency domain, the number of collisions at a specific CSI-RS port may be minimized. In other words, the PTRS may be designed such that the collisions are distributed over all CSI-RS ports. However, the present disclosure is not limited thereto.

Proposal 1-2 (Frequency Interval Between PTRSs)

Figure 4:
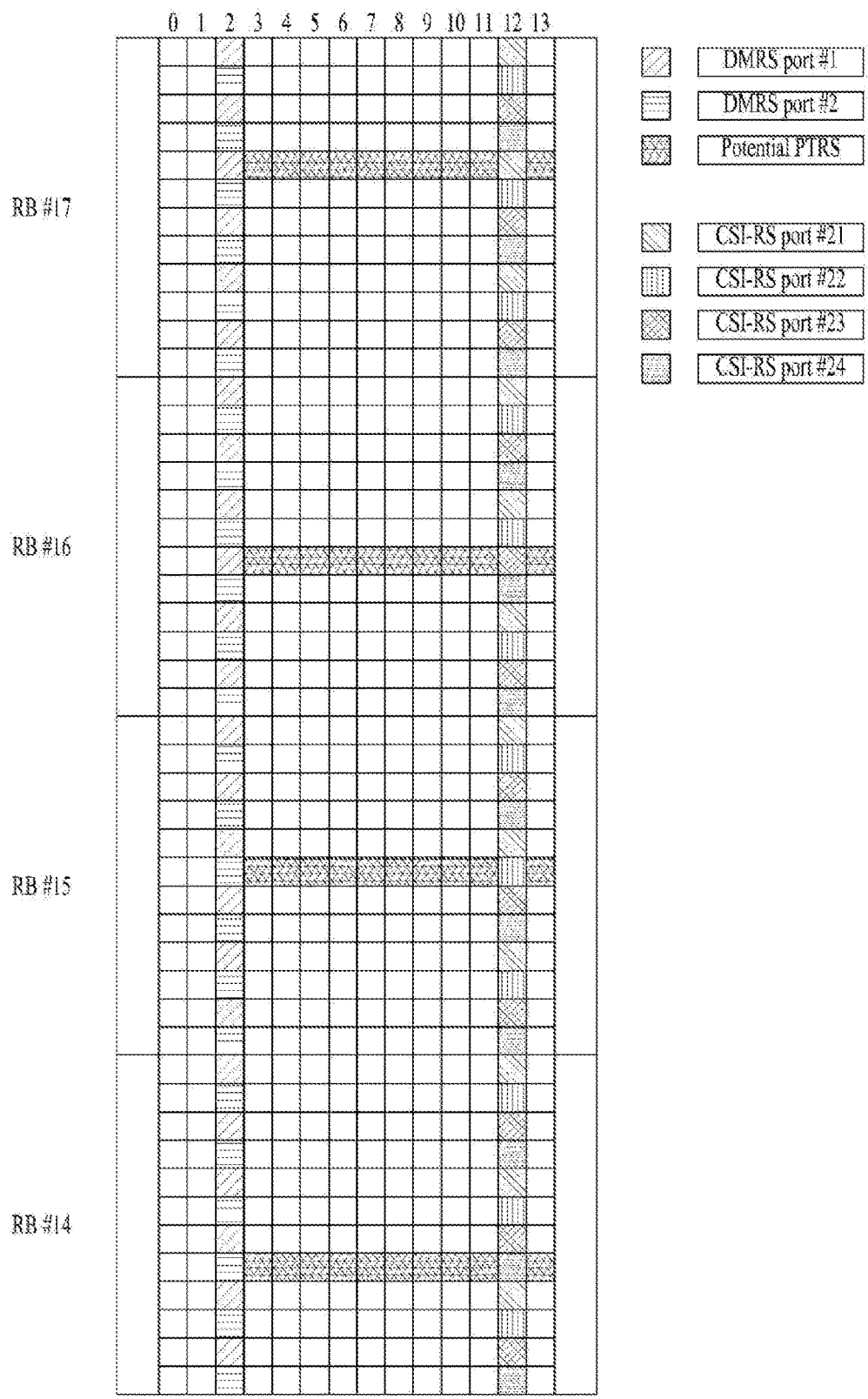
FIG. 4 is a diagram illustrating a PTRS allocation method when a PTRS collides with a CSI-RS.

FIG. 4 illustrates a method of determining the location of a PTRS in the frequency domain by considering a CSI-RS. Specifically, a UE may define the PTRS or data at a (potential) PTRS location. In particular, the PTRS may not be defined at other locations except the potential PTRS location. A base station may predetermine potential PTRS locations such that PTRS collisions are distributed over all CSI-RS ports and then inform the UE of the potential PTRS locations through at least one of RRC, MAC-CE, and DCI.

In other words, the base station may share with the UE information on a potential region where PTRSs may be located. Thus, the PTRSs may be efficiently located.

Proposal 2 (Shifting of PTRS Frequency Location when PTRS Collides with Other Reference Signals)

If a PTRS collides with other reference signals (RSs) (e.g., CSI-RS, SRS, tracking RS, etc.), the frequency location of the PTRS may be shifted within a corresponding RB such that the PTRS is positioned at a frequency location capable of avoiding collisions with the other RSs and, at the same time, closest to the current location among frequency locations at which a specific DMRS port in a DMRS port group associated with the PTRS is positioned.

For example, the frequency location of the PTRS may be shifted to a frequency location capable of avoiding collisions with other RSs and closest to the current location among frequency locations at which a DMRS port to which the PTRS is currently mapped is positioned.

When it is said that a PTRS port is associated with a DMRS port group ((1:M(>=1)), it may mean that a common phase error (CPE) or a phase-shift estimation value calculated using the PTRS port may be applied to all DMRS ports in the DMRS port group. Meanwhile, all DMRS ports in the DMRS port group may be limited to DMRS ports allocated to a corresponding UE through DCI.

When it is said that a PTRS port is associated with a DMRS port (1:1), it may mean that the PTRS port and the DMRS port use the same precoder and are defined at the same frequency location.

Figure 5:
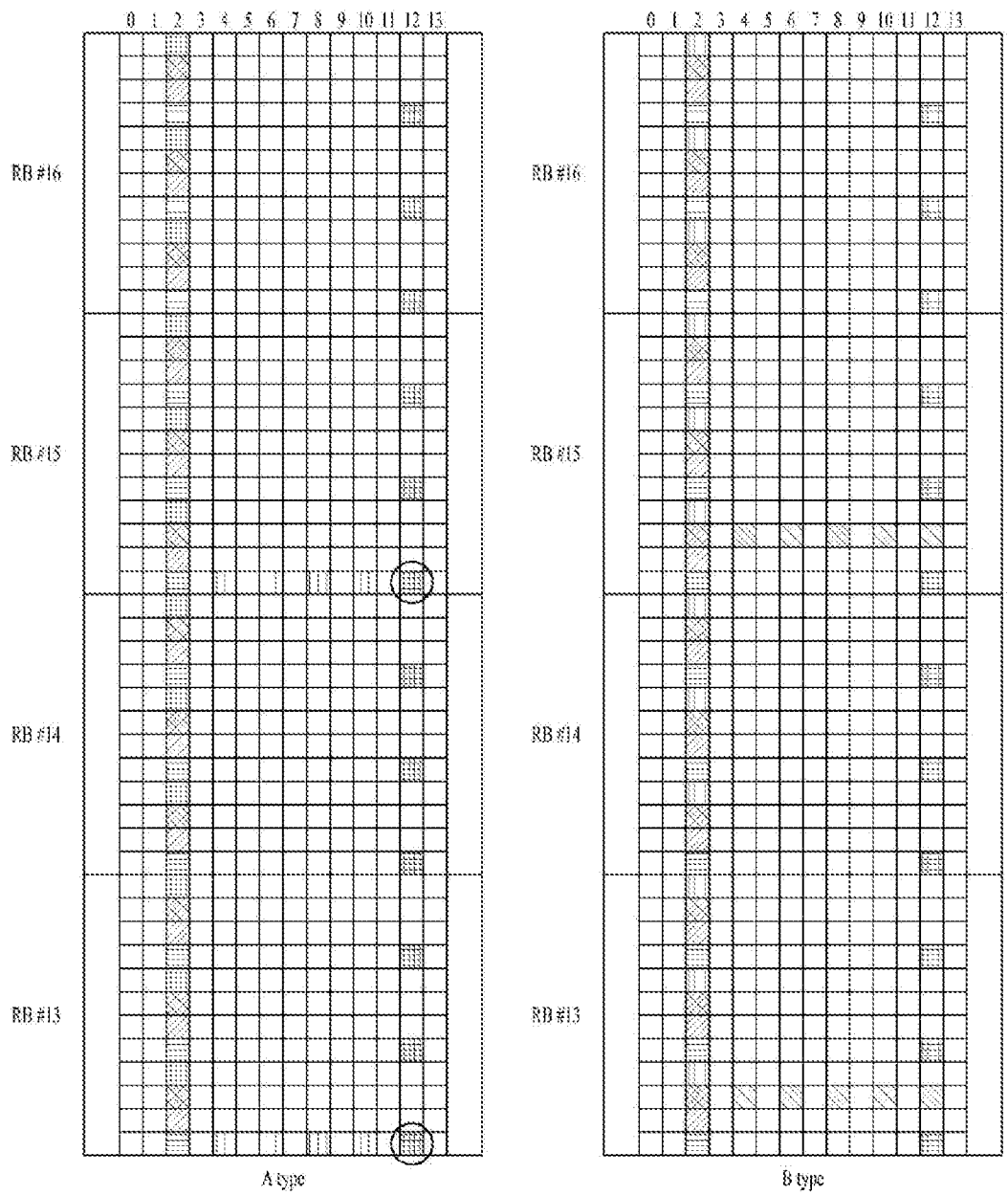
FIG. 5 is a diagram illustrating a PTRS allocation method when a PTRS collides with a CSI-RS.

Specifically, referring to FIG. 5, a UE may be configured with PTRS port #1(a). Each PTRS port may be located at the lowest frequency index within a corresponding RB among DMRS ports in a DMRS port group associated with the PTRS port. In FIG. 5, a CSI-RS port may be transmitted at a fixed frequency interval. When CSI-RS port #1 is transmitted as shown in FIG. 5, PTRS port #1(a) and CSI-RS port #1 may collide with each other in RB #13 and RB #15. In this case, PTRS port #1(a) may be exceptionally shifted to PTRS port #1(b) in RB #13 and RB #15. PTRS port #1(b) may be positioned at the same frequency location as that of a DMRS port associated with PTRS port #1(a). By doing so, the collision may be avoided.

When RSs are allocated as shown in FIG. 5, the PTRS may be positioned at a subcarrier with the lowest index among frequency locations at which a DMRS port associated with the PTRS is positioned within a corresponding RB. This corresponds to type A of FIG. 5. Meanwhile, when the PTRS collides with other RSs, the PTRS may be positioned at a location capable of avoiding collisions with the other RSs and closest to the current location among frequency locations at which a DMRS port associated with the PTRS is positioned within a corresponding RB. That is, when the PTRS collides with the other RSs, the PTRS may be located as shown in type B of FIG. 5.

Moreover, the frequency location of the PTRS may be shifted such that the PTRS is positioned at a frequency location capable of avoiding collisions with other RSs and closest to the current location among frequency locations at which a random DMRS port in a DMRS port group including a DMRS port to which the PTRS is currently mapped is positioned.

All DMRS ports in the DMRS port group may be limited to DMRS ports allocated to a corresponding UE through DCI.

The above-described arrangement method may be applied independently for each RB. That is, the method may be applied independently to the PTRS in each RB. In this case, each RB may have a different PTRS shifting distance. However, the present disclosure is not limited thereto.

According to the above-described arrangement method, the basic location of the PTRS is determined as a subcarrier with the lowest index among frequency locations at which a DMRS port associated with the PTRS is positioned. In contrast to the above method, the basic location may be determined as a subcarrier with the highest index. In this case, shifting may be performed in the opposite direction.

Consequently, the shifting location of the PTRS may be determined implicitly without explicit signaling as described above.

Figure 6:
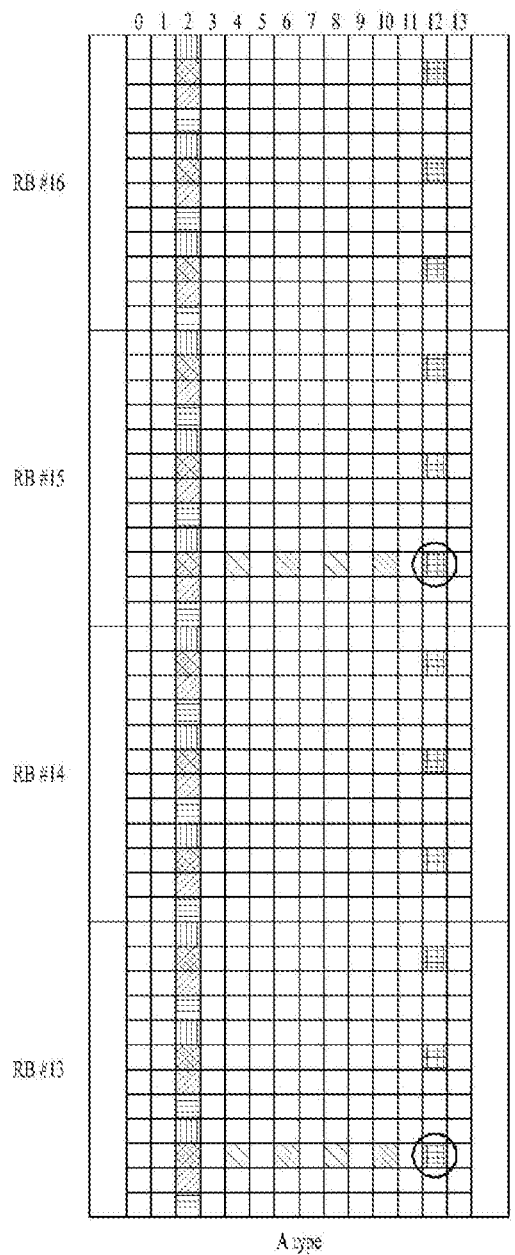
FIG. 6 is a diagram illustrating a PTRS allocation method when a PTRS collides with a CSI-RS.
Figure 6:
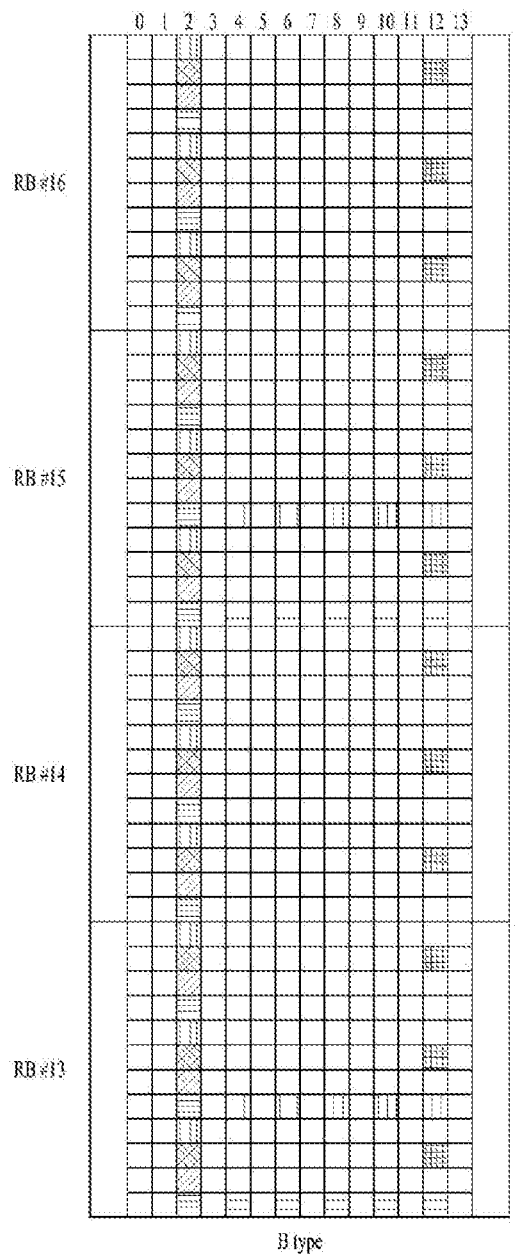

Referring to FIG. 6, a UE may be configured with PTRS port #1(a). Each PTRS port may be located at the third frequency index within a corresponding RB among DMRS ports in a DMRS port group associated with the PTRS port. However, this is merely an example, and the present disclosure is not limited thereto.

In FIG. 6, CSI-RS port #1 may be transmitted at a fixed frequency interval. In this case, the CSI-RS may collide with PTRS port #1(a) in RB #13 and RB #15. Thus, PTRS port #1(a) may be exceptionally shifted to PTRS port #1(b) or PTRS port #1(c) in RB #13 and RB #15. PTRS port #1(b) or PTRS port #1(c) may be positioned at the same frequency location as that of a DMRS port associated with PTRS port #1(a).

When PTRS port #1(a) is shifted to PTRS port #1(b) or PTRS port #1(c), there may be an ambiguity about shifting. In other words, an indication about shifting may be required. Thus, using at least one of RRC, MAC-CE, and DCI, a base station may inform a UE which one of PTRS port #1(b) or PTRS port #1(c) PTRS port #1(a) is shifted to. It may be defined as a rule in specifications, but the present disclosure is not limited thereto.

Figure 7:
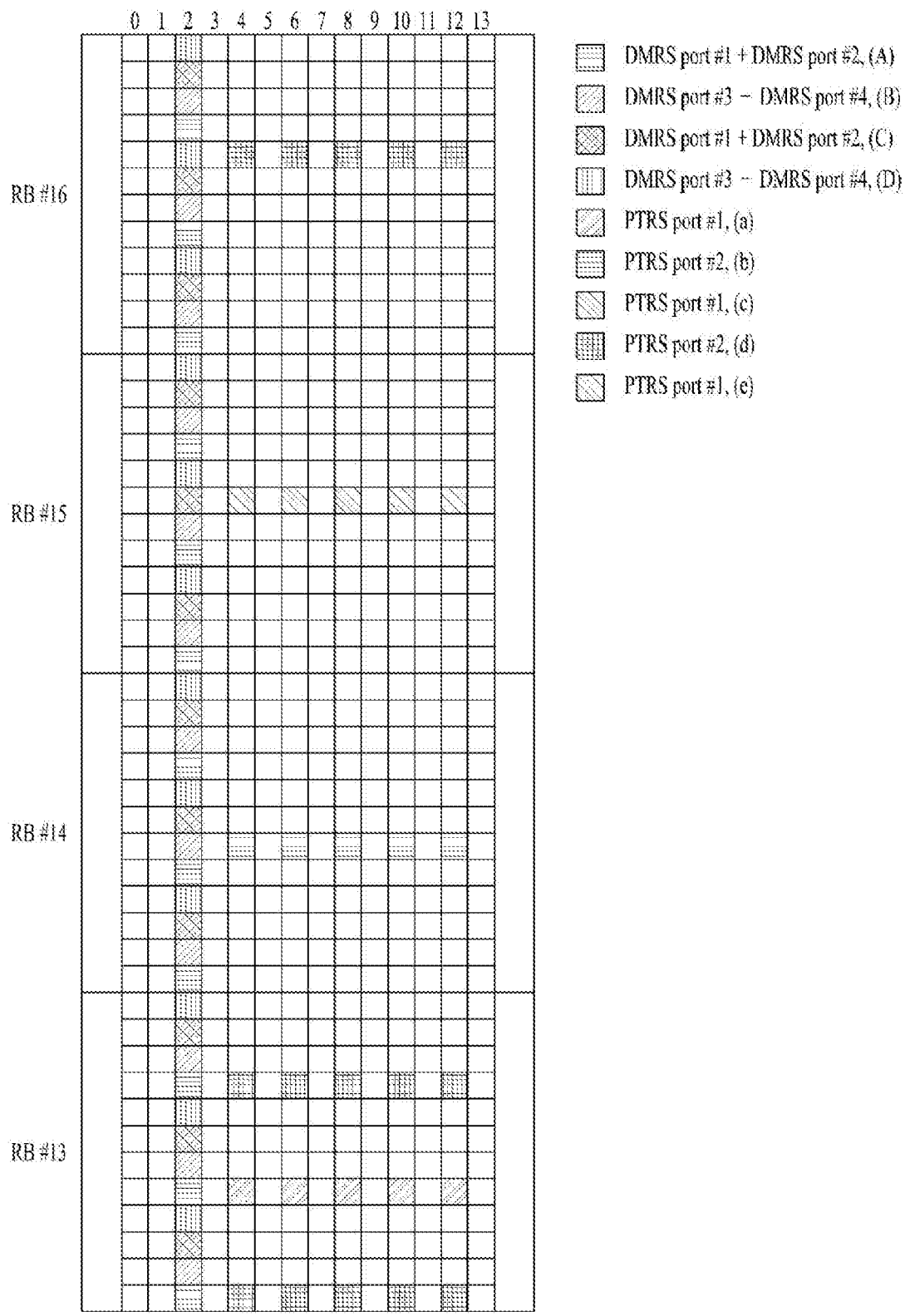
FIG. 7 is a diagram illustrating a PTRS allocation method when a PTRS collides with a CSI-RS.

Referring to FIG. 7, when other RSs occupy the entirety (or most) of a specific OFDM symbol within a bandwidth allocated to a UE, the UE may transmit no PTRS in the corresponding OFDM symbol. That is, when the other RSs are allocated to the entirety or most of the specific OFDM symbol, no PTRS transmission may be required since there is no data transmission.

The candidate shifting locations may be restricted to DMRS port locations having the same orthogonal cover code (OCC) or cyclic shift (CS) as that of a DMRS at the current frequency location. For example, when PTRS port #1(a) collides with other RSs in RB #13 in FIG. 7, shifting may be performed only at a location at which DMRS port #1+DMRS port #2(A) may be positioned (e.g., PTRS port #1(e)). That is, DMRS port #1—DMRS port #2(B) may be excluded from the candidate shifting locations, but the present disclosure is not limited thereto.

Proposal 3 (Shifting of PTRS Frequency Location when PTRS Collides with Other RSs)

When a PTRS collides with other RSs (e.g., CSI-RS, SRS, tracking RS, etc.), the frequency location of the PTRS may be shifted to a frequency location capable of avoiding collisions with the other RSs and closest to the current location within an RB.

Figure 8:
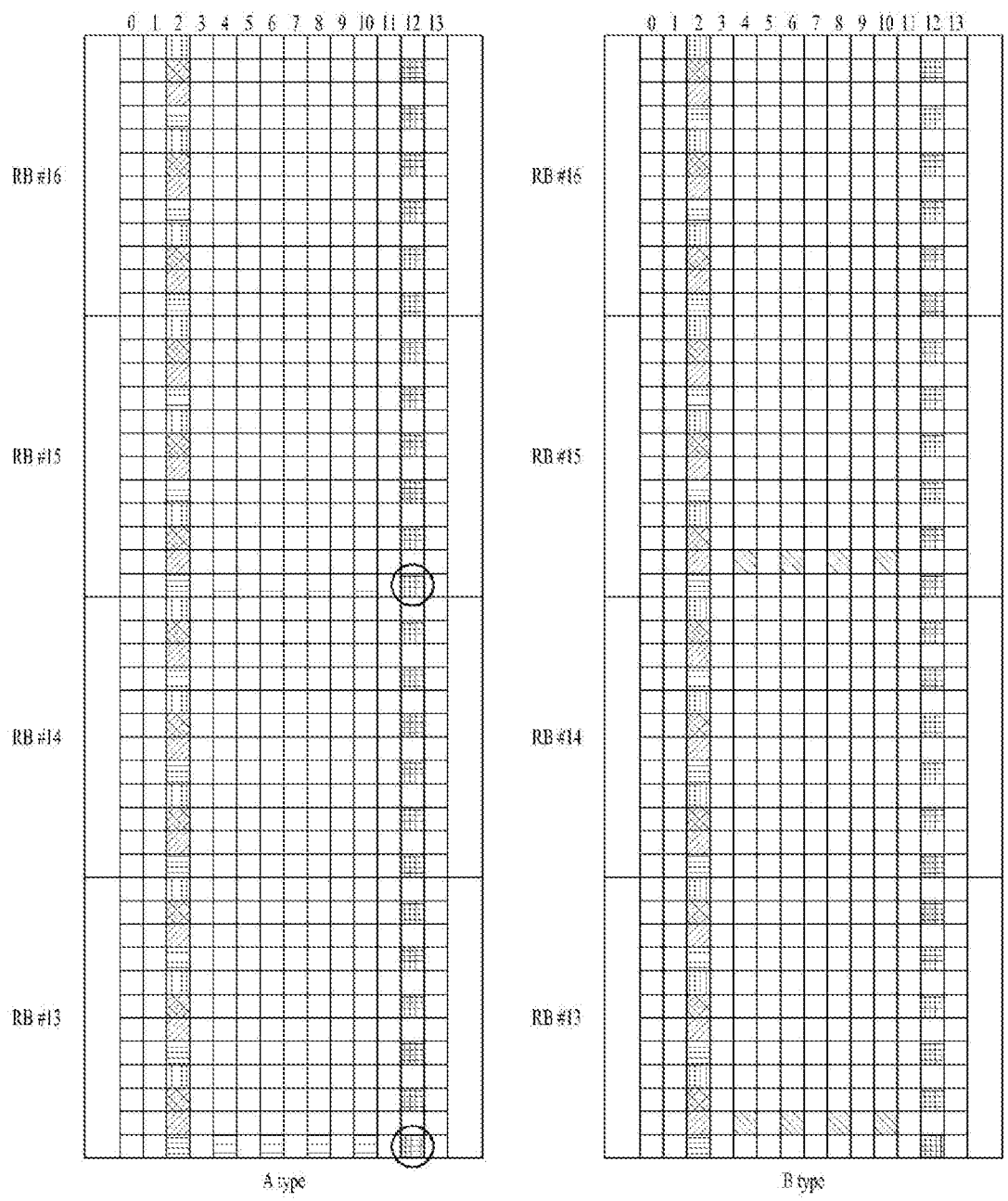
FIG. 8 is a diagram illustrating a PTRS allocation method when a PTRS collides with a CSI-RS.

Referring to FIG. 8, a UE may be configured with PTRS port #1(a). In this case, each PTRS port may be located at the lowest frequency index within a corresponding RB among DMRS ports in a DMRS port group associated with the PTRS as described above.

When CSI-RS port #1 is transmitted at a fixed frequency interval as shown in FIG. 8, the CSI-RS may collide with PTRS port #1(a) in RB #13 and RB #15. However, in FIG. 8, if the PTRS port is shifted according to the method in proposal 2, the collision may still be present. In other words, even if a PTRS port is shifted according to the method in proposal 2, a collision may occur depending on how CSI-RS ports are arranged.

Thus, it may be considered that the PTRS is shifted to a DMRS port which is not associated with the PTRS port. Referring to type B of FIG. 8, it can be seen that PTRS port #1(b) is located at a frequency location which is different from that of a DMRS port associated with PTRS port #1(a). In this case, PTRS port #1(b) may be shifted to a frequency location closest to PTRS port #1(a) within an RB.

If there is an unavoidable collision even though a PTRS port is shifted according to the method in proposal 2, the method in proposal 3 may be applied. However, the present disclosure is not limited thereto.

Specifically, in FIG. 8, the PTRS may be located at a subcarrier with the lowest index among frequency locations at which a DMRS port associated with the PTRS is positioned within a corresponding RB. This allocation may correspond to type A of FIG. 8. In this case, if it is expected that the PTRS collides with other RSs, the PTRS may be shifted to a different frequency location capable of avoiding collisions with the other RSs within the corresponding RB. For example, the PTRS may be shifted to a frequency location closest to the current location. This allocation may correspond to type B of FIG. 8. The above-described PTRS shifting method may be applied independently to the PTRS in each RB. That is, each RB may have a different PTRS shifting distance.

According to the above-described shifting method, the basic location of the PTRS may be determined as a subcarrier with the lowest index among frequency locations at which a DMRS port associated with the PTRS is positioned. However, the basic location may be determined as a subcarrier with the highest index, and then PTRS shifting may be performed. In this case, the PTRS shifting may be performed in the opposite direction. Consequently, the shifting location of the PTRS may be determined implicitly without explicit signaling as described above.

Proposal 4 (Shifting of PTRS Time-Domain Location when PTRS Collides with Other RSs)

Figure 9:
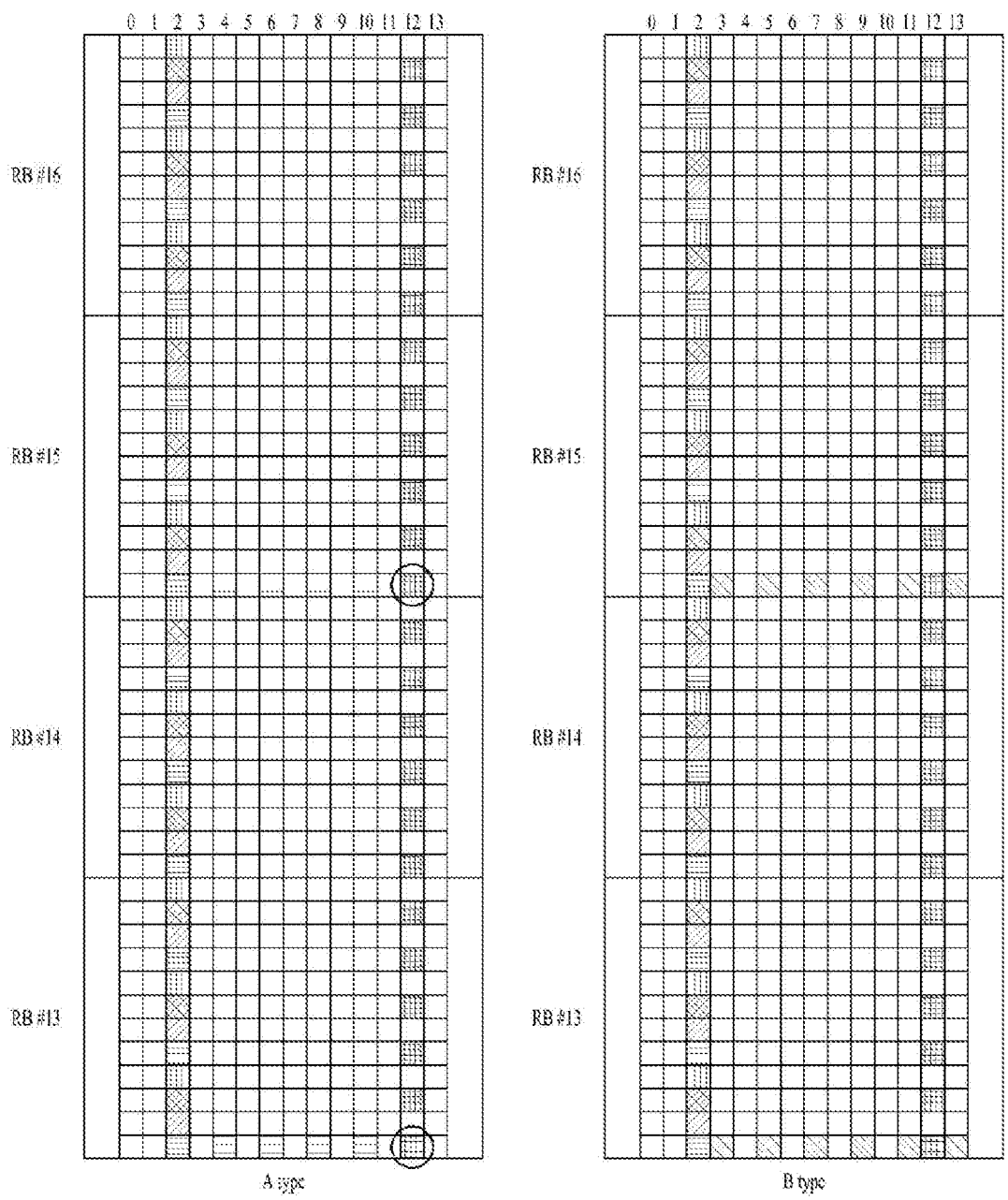
FIG. 9 is a diagram illustrating a PTRS allocation method when a PTRS collides with a CSI-RS.

Referring to FIG. 9, a UE may be configured with PTRS port #1(a). Each PTRS port may be located at the lowest frequency index within a corresponding RB among DMRS ports in a DMRS port group associated with the PTRS port as described above. For example, if CSI-RS port #1 is allocated and transmitted at a fixed frequency interval, there may be a collision between PTRS and CSI-RS ports. Referring to FIG. 9, it can be seen that PTRS port #1(a) collides with the CSI-RS port in RB #13 and RB #15.

For example, type A of FIG. 9 shows the current location of a PTRS, and type B of FIG. 9 shows that while the frequency location of the PTRS is fixed, the time-domain location thereof is shifted. The PTRS location may be shifted in the time domain as shown in FIG. 9.

Among proposals 2 to 4, proposal 2 may be preferentially applied. The PTRS port may be shifted to the location corresponding to the lowest index among DMRS ports in a DMRS port group. That is, the shifting may be performed first in the frequency domain. However, when there is an unavoidable collision even though the PTRS shifting is performed based on CSI-RS patterns, proposals 3 and 4 may be selectively applied.

When the PTRS is located at an interval of one or more symbols (i.e., pattern #2), if there is an unavoidable collision even though proposal 2 is applied, the PTRS shifting may be performed according to proposal 4. That is, due to the symbol gap between the PTRSs, the shifting may be performed in the time domain, thereby avoiding the collision.

In this case, the shifting location in the time domain may be equally applied to all resource blocks allocated to the UE through DCI.

Meanwhile, when the PTRS is located at all symbols (i.e., pattern #1), if there is an unavoidable collision even though proposal 2 is applied, the PTRS shifting may be performed according to proposal 3. That is, since the PTRS cannot be shifted in the time domain, the shifting needs to be performed to the closest frequency location as described in proposal 3.

It may be configured that proposal 2 has the highest priority, proposal 4 has the second highest priority, and proposal 3 has the third highest priority.

In summary, the PTRS may be shifted according to proposal 2. If there is an unavoidable collision, the PTRS may be shifted in the time domain according to proposal 4. If the unavoidable collision is still present after the PTRS is shifted in the time domain, the PTRS may be shifted again to the closest frequency location according to proposal 3. However, the present disclosure is not limited thereto.

Proposal 5 (PTRS Location Signaling)

A base station may inform a UE of the time-domain location of a PTRS using at least one of RRC, MAC-CE, and DCI.

Figure 10:
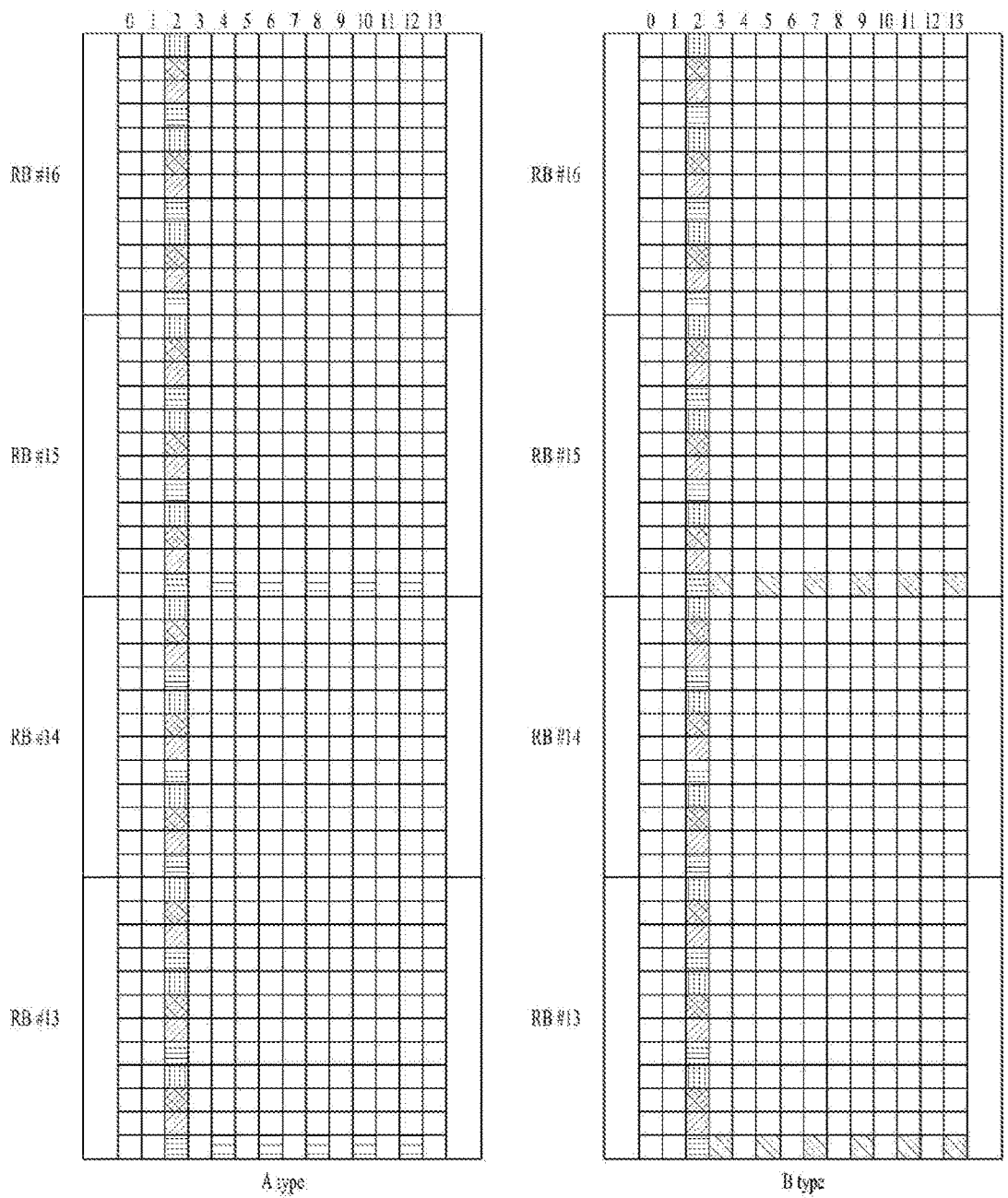
FIG. 10 is a diagram illustrating a PTRS allocation method.

Referring to FIG. 10, PTRS pattern #2 may have two types: type A and type B. In type A, the PTRS may be located at an interval of one or more symbols starting from the time-domain location at which a DMRS port is located. In type B, the PTRS may be located at an interval of one or more symbols starting from a symbol beyond the time-domain location at which a DMRS port is located.

In this case, the base station may inform the UE which one of the two patterns is to be used through at least one of the RRC, MAC-CE, and DCI. Further, the base station may configure another pattern and inform the UE that the pattern is to be used. However, the present disclosure is not limited thereto.

Proposal 6 (PTRS Location Signaling)

A base station may set the time-domain interval between PTRSs to be equal to or more than 2 in a slot (or subframe) where a CSI-RS is transmitted and then inform a UE of the time-domain interval through at least one of RRC, MAC-CE, and DCI. In addition, the base station transmits the CSI-RS in an OFDM symbol where no PTRS is defined.

Figure 11:
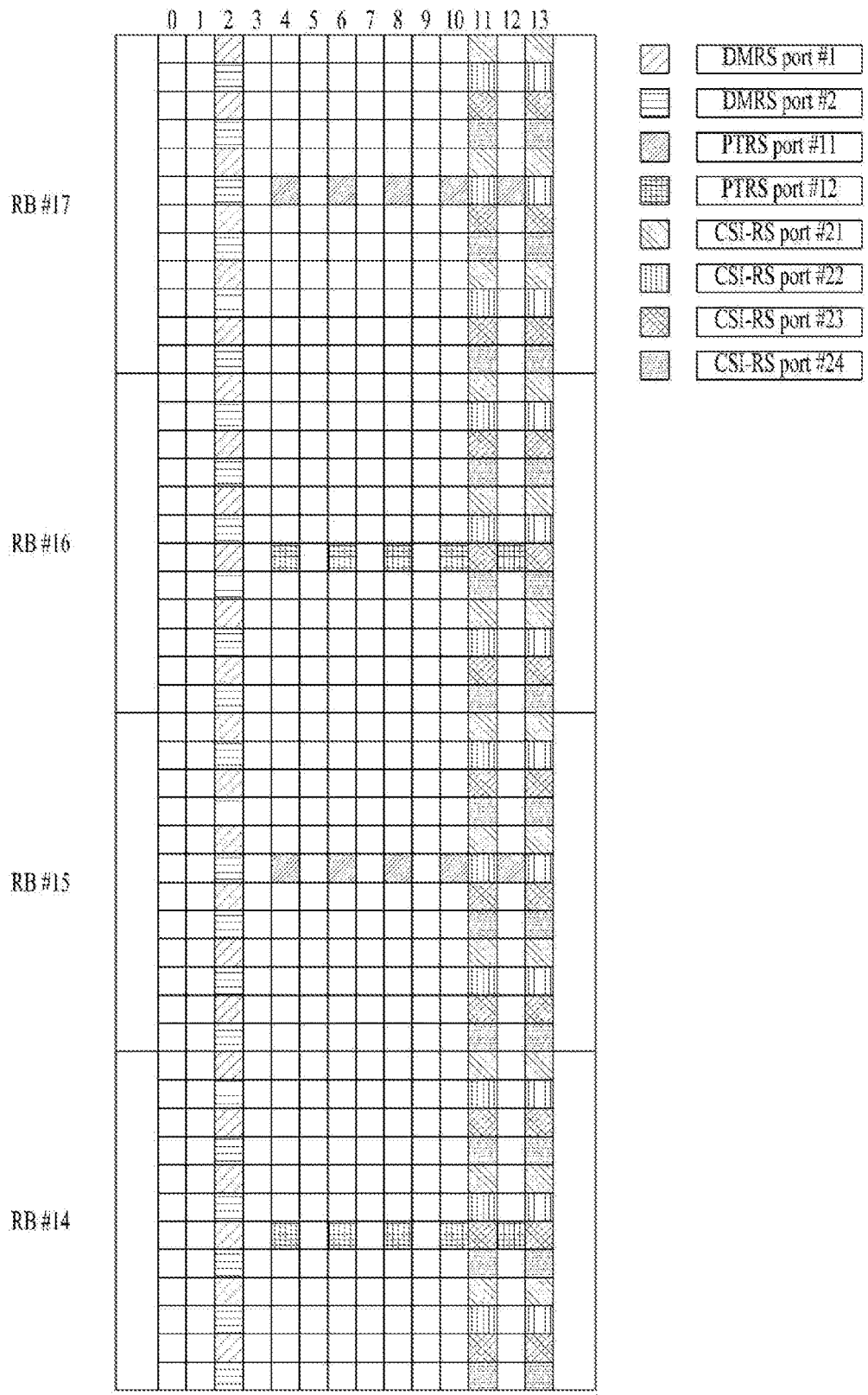
FIG. 11 is a diagram illustrating a PTRS allocation method when a PTRS collides with a CSI-RS.

FIG. 11 shows PTRS pattern #2. That is, FIG. 11 shows that the time-domain interval between PTRSs is 2. In this case, the base station may allocate the PTRS such that it does not overlap with the CSI-RS. Meanwhile, since PTRS pattern #2 shows performance similar to that of PTRS pattern #1 in most modulation and coding scheme (MCS) levels, allocation may be performed as described above.

Meanwhile, the base station may inform the UE that CSI-RSs are transmitted in specific slots in a specific frame through at least one of the RRC, MAC-CE, and DCI. In this case, the UE does not use PTRS pattern #1 in the corresponding slots. In other words, the PTRS may not be allocated to all slots.

When PTRS pattern #1 (PTRS time-domain interval=1) is not defined, the above-mentioned signaling may not be required.

When the PTRS is defined as described above, the CSI-RS may be transmitted in a random OFDM symbol where no PTRS is defined. Although FIG. 11 shows that the CSI-RS is transmitted in symbols #11 and 13, the CSI-RS may be transmitted in symbols #3, 5, 7, 9, 11, and 13.

Figure 12:
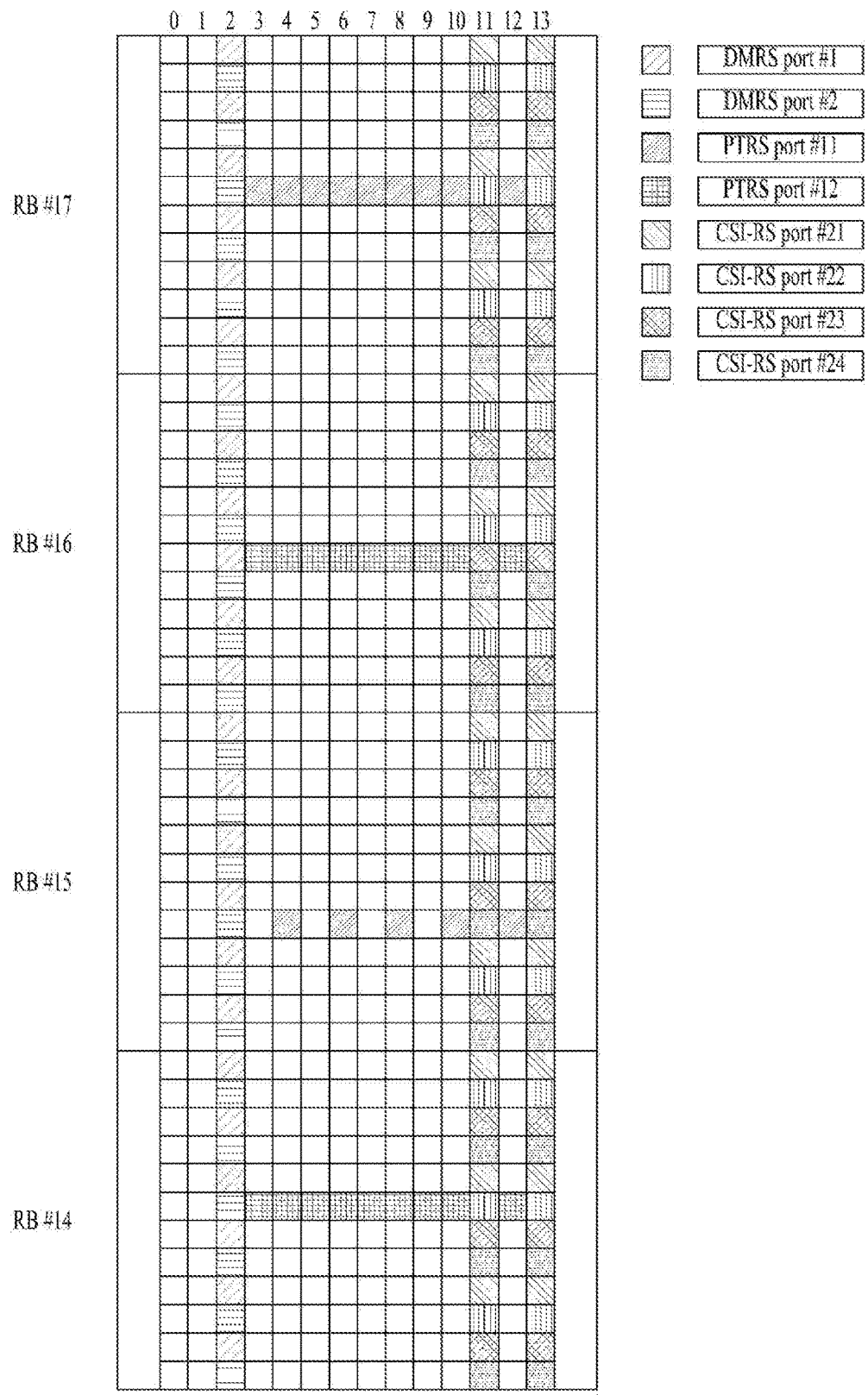
FIG. 12 is a diagram illustrating a PTRS allocation method when a PTRS collides with a CSI-RS.

Referring to FIG. 12, the OFDM symbol in which the CSI-RS is to be transmitted may be punctured for the PTRS. In this case, if data is not transmitted in the OFDM symbol in which the CSI-RS is to be transmitted, phase noise estimation may not be required in the corresponding OFDM symbol. Thus, there is no performance degradation due to puncturing.

Although FIG. 12 shows that the CSI-RS is allocated to symbols #11 and 13, the CSI-RS may be allocated to other locations and then transmitted as described above. In this case, the PTRS may be punctured at the locations where the CSI-RS is to be transmitted. However, the present disclosure is not limited thereto.

Proposal 7 (PTRS Puncturing)

If a PTRS overlaps with a CSI-RS in a specific OFDM symbol, the PTRS may be punctured. In this case, an additional PTRS may be transmitted in a region where there is no overlap therebetween. A base station may inform a UE of a method of defining the additional PTRS, using at least one of RRC, MAC-CE, and DCI. Alternatively, the method of defining the additional PTRS may be defined as a rule in specifications.

Figure 13:
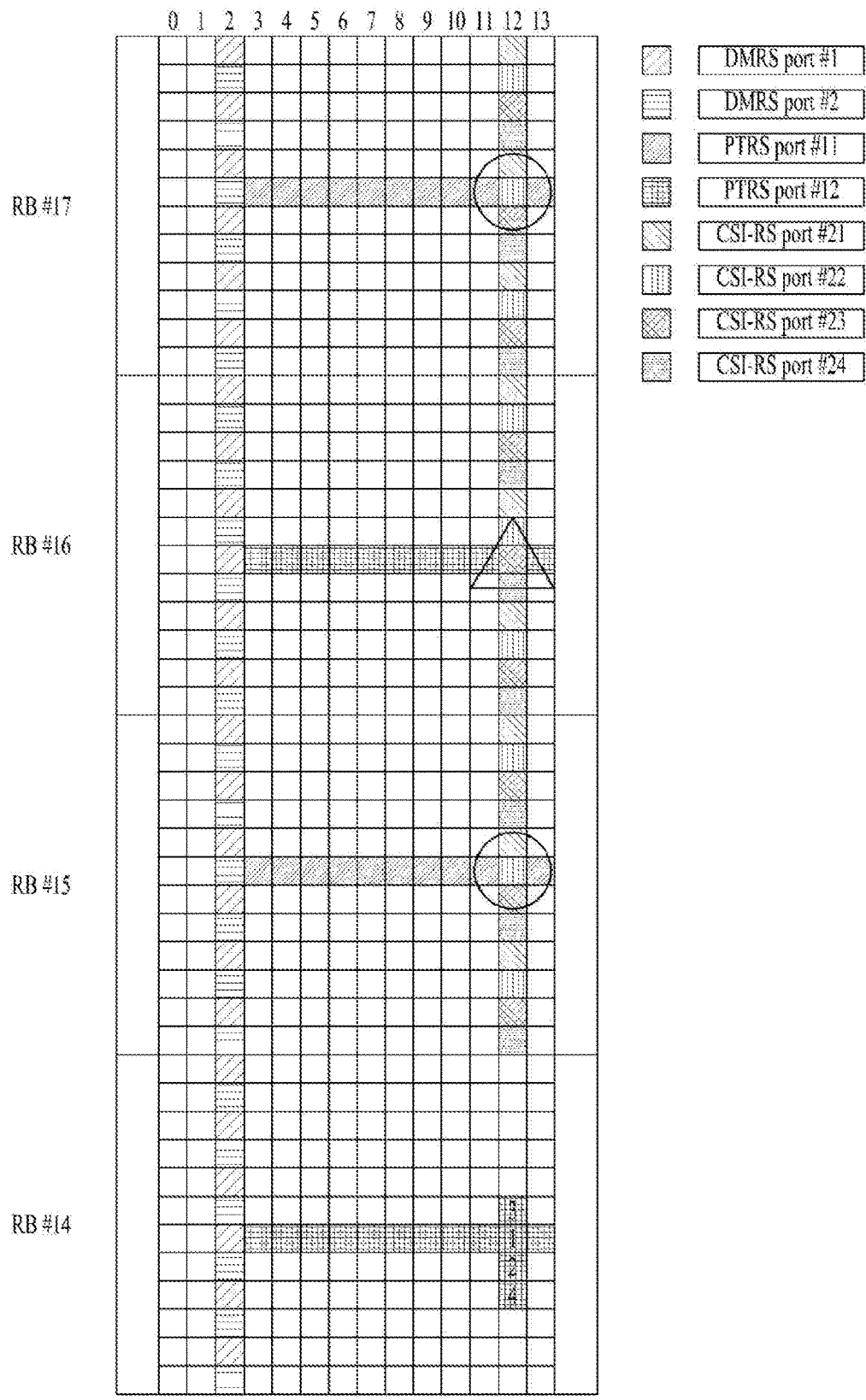
FIG. 13 is a diagram illustrating a PTRS allocation method when a PTRS collides with a CSI-RS.

FIG. 13 illustrates that PTRSs collide with CSI-RSs in RBs #15 to #17 and no CSI-RS is transmitted in RB #14. In this case, an additional PTRS may be defined and transmitted in RB #14 where no CSI-RS is transmitted. The additional PTRS is defined and transmitted as follows. First, a difference between the number of PTRSs required in one OFDM symbol and the number of valid PTRSs therein is calculated. Then, the additional PTRS may be transmitted based on the difference. FIG. 13 shows that three PTRSs are required since there are a total of three collisions in RBs #15 to 17. In this case, the PTRSs may be sequentially defined at the top and bottom of the original position and then transmitted.

In addition, it may be considered that RB #13 is additionally allocated. If no CSI-RS is transmitted even in RB #13, two additional PTRSs may be defined and transmitted in each of RBs #13 and #14.

In proposals 1 to 7, methods of minimizing or avoiding a collision between a signal defined in the frequency domain such as the CSI-RS and a signal defined in the time domain such as the PTRS have been described. Meanwhile, considering that the SRS is also defined in the frequency domain, it may collide with an uplink (UL) PTRS. Therefore, proposals 1 to 7 may be equally applied to the SRS and UL PTRS.

In addition, in the case of ultra-reliable and low-latency communications (URLLC), data may be transmitted in one or two OFDM symbols. In this case, the data may collide with the PTRS, and thus the methods in proposals 1 to 7 may be equally applied to solve the collision problem.

In summary, proposals 1 to 7 may be applied when a PTRS collides with a signal defined in the frequency domain (e.g., SRS, CSI-RS, etc.) or data (e.g., URLLC), but the present disclosure is not limited thereto.

Proposal 8 (Priority with Regard to PTRS Depending on CSI-RS Type)

The priority with regard to the PTRS may be determined based on CSI types. In the case of a zero-power (ZP) CSI-RS, since it is explicitly defined by a base station that rate-matching is performed on a corresponding part, the ZP CSI-RS may have the highest priority. That is, when the PTRS collides with the ZP CSI-RS, the PTRS may not be transmitted. In the case of an aperiodic non-zero-power (NZP) CSI-RS, if the base station explicitly instructs a UE to perform CSI estimation through the NZP CSI-RS, it may have a higher priority than the PTRS.

In the case of a periodic NZP CSI-RS with measurement restrictions, the UE may transmit the CSI-RS periodically. In this case, if there are measurement restrictions, since it cannot be averaged with previous CSI, the impact of a collision with the PTRS may increase. Thus, the periodic NZP CSI-RS with measurement restrictions may have a higher priority than the PTRS.

In the case of a periodic NZP CSI-RS with no measurement restriction, the UE may transmit the CSI-RS periodically. In this case, since it may be averaged with previous CSI, although some REs are damaged, the impact may not be significant. Thus, in the case of aperiodic CSI-RS transmission, the PTRS may be transmitted instead of the CSI-RS. However, another UE that does not use the PTRS cannot know whether some REs are used for PTRS transmission if there is no separate signalling. Thus, the CSI-RS and PTRS may be simultaneously transmitted. In this case, proposals 1 to 8 may be used to avoid a collision, but the present disclosure is not limited thereto.

The bandwidth in which a NZP CSI-RS is transmitted may occupy most of the bandwidth allocated for the UE. In this case, it is not necessary to perform channel estimation on a corresponding OFDM symbol. That is, the PTRS may not be transmitted, and thus, no collision may occur.

Regardless of the measurement restrictions, the PTRS may not be transmitted in the OFDM symbol and bandwidth where the NZP CSI-RS is transmitted.

In the case of UL, a ZP SRS may be introduced for UL interference measurement or rate-matching. In addition, the measurement restriction may be introduced for a NZP SRS. Moreover, periodic SRS transmission or aperiodic SRS transmission may also be considered. In this case, the priorities of the ZP SRS, aperiodic NZP SRS, periodic NZP CSI-RS with measurement restrictions, and periodic NZP CSI-RS with no measurement restriction with regard to the PTRS may be applied in the same way as in the case of the CSI-RS. However, the present disclosure is not limited thereto.

Proposal 9 (Determination of PTRS Time-Domain Location)

Figure 14:
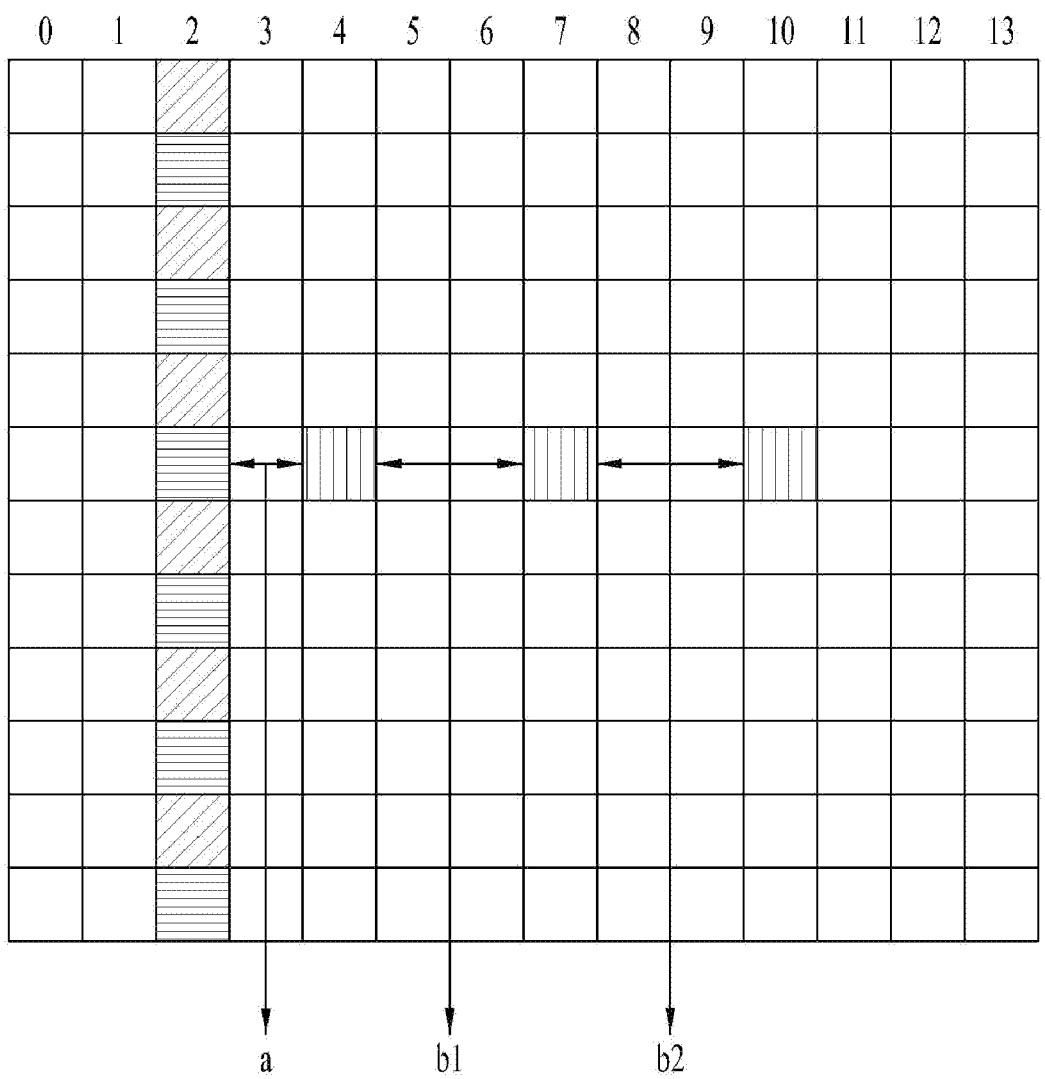
FIG. 14 is a diagram illustrating a method of configuring an interval for PTRS allocation.

The location of a PTRS in the time domain may be determined. Referring to FIG. 14, each of a, b1, and b2 may mean an interval between adjacent PTRSs. In this case, the number of PTRSs in the time domain may be changed (e.g., when the number of PTRSs is N, an interval may be defined as $b\_(N-1)$), where a is determined by the magnitude of a residual carrier frequency offset (CFO) and b1 and b2 are determined by at least one of an MCS, a bandwidth, a center frequency, and subcarrier spacing.

Figure 15:
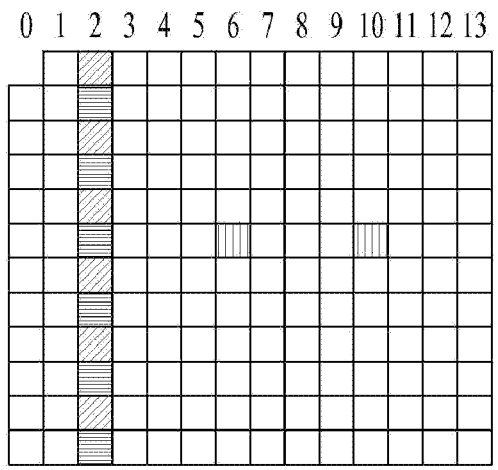
FIG. 15 is a diagram illustrating a method of configuring an interval for PTRS allocation.
Figure 15:
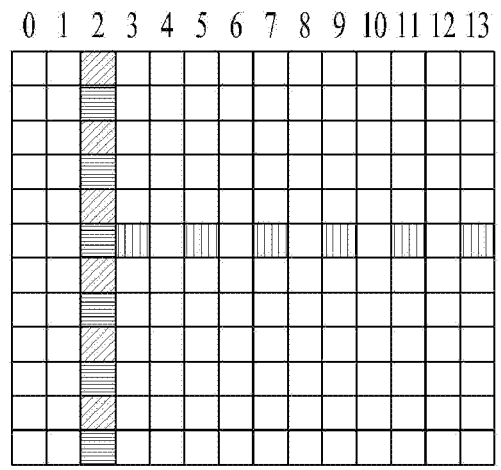
Figure 15:
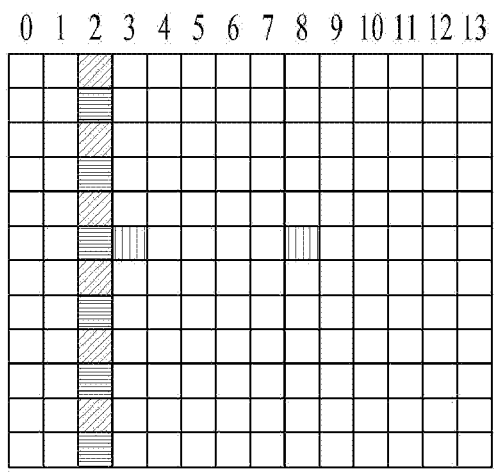
Figure 15:
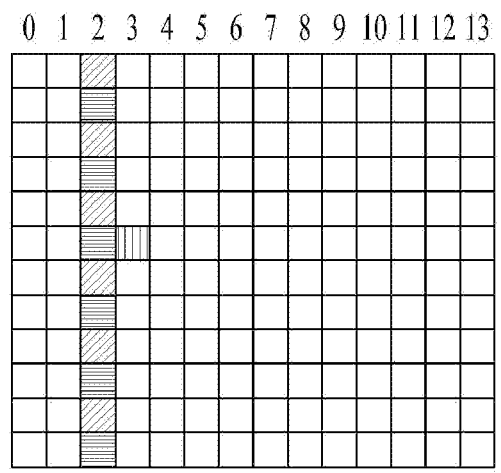

FIG. 15 illustrates four PTRS time-domain patterns. If the residual CFO is large, a may have a small value. Each of patterns #3 and #4 of FIG. 15 may correspond to a case where the value of a is small.

If the residual CFO is small, a may have a large value. Pattern #1 of FIG. 15 may correspond to a case where the value of a is large. That is, the distance from the time-domain location at which the DMRS is allocated to the PTRS may increase.

When the residual CFO is large and when at least one of the bandwidth and the MCS is also large, the values of a and b may decrease. Pattern #2 of FIG. 15 may correspond to a case where both a and b have small values. However, the RS overhead may be highest.

Figure 16:
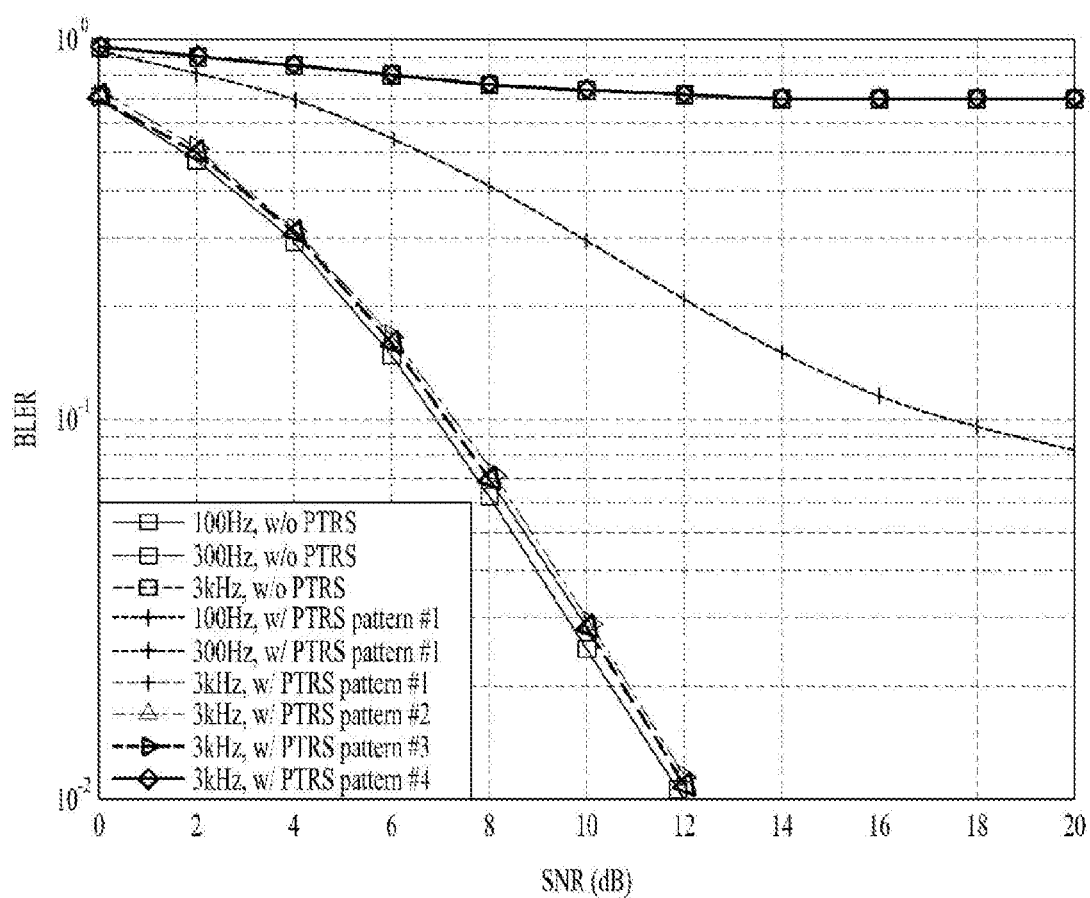
FIG. 16 is a diagram illustrating that block error rate (BLER) performance depends on PTRS patterns.

FIG. 16 illustrates simulation results in the above case. Specifically, FIG. 16 shows block error rate (BLER) performance depending on the use of a PTRS when there is a residual CFO (100 Hz, 300 Hz, 3 kHz) and phase noise. In this case, the MCS and coding rate may be QPSK and ½, respectively. Referring to FIG. 16, it can be seen that when the residual CFO is 300 Hz, the BLER performance is similar regardless of whether the PTRS is used. In other words, when the residual CFO is small, the performance is similar regardless of whether the PTRS is used.

Meanwhile, when the residual CFO is 3 kHz, the performance may significantly vary depending on the presence or absence of the PTRS. Since pattern #2 of FIG. 15 has the densest structure than other patterns, it shows the most stable performance. In the case of patterns #1 and #4, the performance may be significantly degraded due to an insufficient number of PTRSs.

In the case of pattern #1, since the distance between the DMRS and the second PTRS in the time domain is relatively long, the residual CFO may not be estimated due to the long distance, and as a result, the performance may be significantly degraded. Meanwhile, in the case of pattern #4, since the distance between the DMRS and the second PTRS in the time domain is relatively short, the residual CFO may be successfully estimated. However, the estimated residual CFO may include the value of CPE_3 (the CPE value of OFDM symbol 3). For example, in the case of residual CFO=0.1 and CPE_3=0.01, the actually estimated residual CFO may have a value of 0.11. In this case, the phase rotation error shown in Equation 1 may occur in an n-th OFDM symbol (where n>2).

$$\text{Error} = (n-2) \times \text{Residual } CFO + \text{CPE\_n} - (n-2) \times (\text{Residual } CFO + \text{CPE\_3}) = \text{CPE\_n} - (n-2) \times \text{CPE\_3} \ (n > 2)$$ [Equation 1]

In the case of n=3, the error may be zero. However, as n increases, the error may continuously increase. Thus, in the case of pattern #4, as n increases, the performance may be further degraded due to the channel estimation error in the n-th OFDM symbol.

In the case of pattern #3, since the second PTRS is closer compared to pattern #1, there is no failure in the residual CFO estimation so that the performance degradation may not occur.

In the case of pattern #1, after estimation of the residual CFO based on the first PTRS, the residual CFO is pre-compensated for according to the method described with reference to pattern #4. In addition, if the CPE is estimated using the second PTRS in the pre-compensated state, the performance of pattern #1 may be similar to that of pattern #3. That is, by changing the method of estimating the residual CFO and CPE, the performance of pattern #1 may be improved.

Considering that pattern #1 is denser than pattern #3 in the time domain, pattern #1 may provide better performance than pattern #3 when the environment is sensitive to the phase noise due to a high MCS or a large bandwidth.

Since in the case of pattern #3, the first PTRS is closer to the DMRS compared to pattern #1, pattern #3 has a low estimation failure probability when the residual CFO is large. In particular, if the SNR is low and the residual CFO is large, the failure probability may increase, but it may be minimized in the above manner. The present disclosure is not limited thereto.

Figure 17:
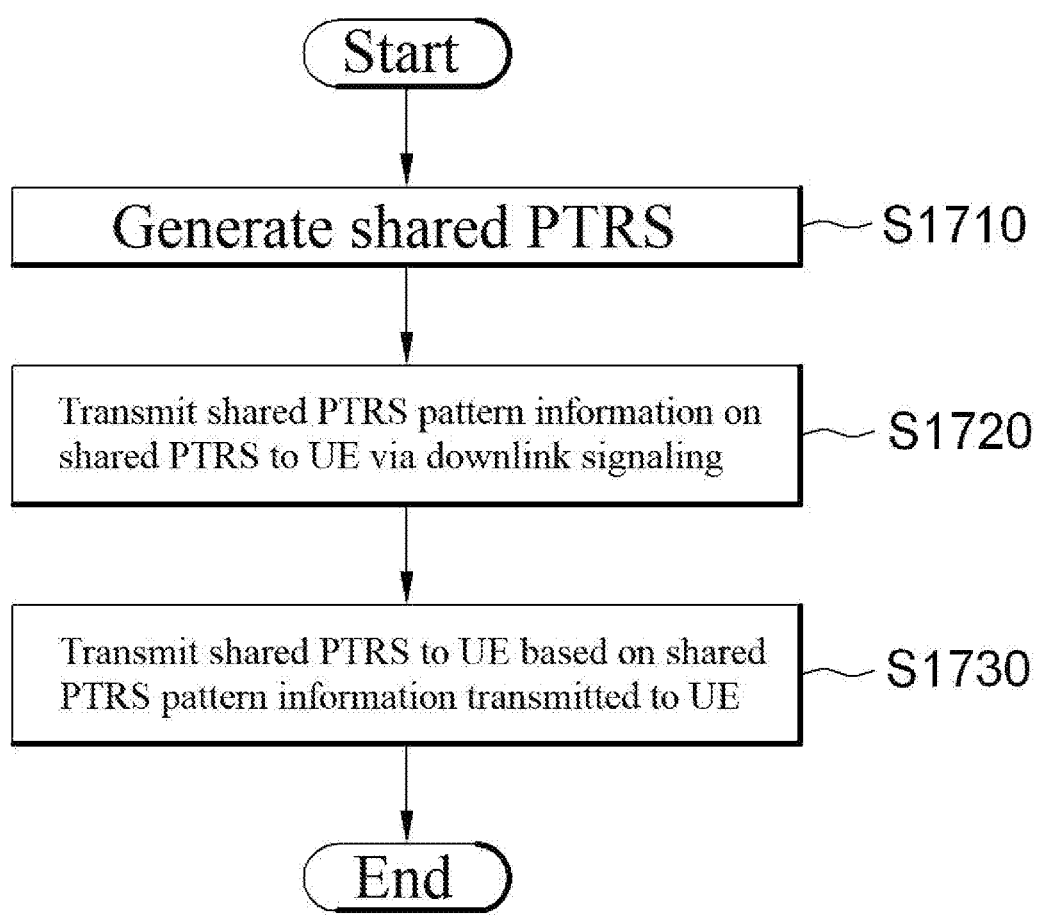
FIG. 17 is a diagram illustrating a PTRS allocation method.

FIG. 17 is a flowchart illustrating a PTRS allocation method.

A base station may generate a PTRS and a first RS (S1710). As described with reference to FIGS. 1 to 16, the first RS may include at least any one of a CSI-RS, an SRS, and a tracking RS. That is, the first RS may mean another RS, and the present disclosure is not limited thereto.

Next, the PTRS and the first RS may be allocated to an RB (S1720). As described with reference to FIGS. 1 to 16, the PTRS may be allocated on the same frequency. In this case, the PTRS may be allocated at an interval of at least one OFDM symbol. Alternatively, the PTRS may be allocated to all OFDM symbols as described above.

Thereafter, the base station may transmit the allocated PTRS and first RS to a UE (S1730). As described with reference to FIGS. 1 to 16, when the PTRS collides with the first RS in the RB, the frequency location of the PTRS may be shifted. In this case, the PTRS frequency location may be shifted to a frequency location closest to the current PTRS frequency location among frequency locations at which DMRS ports in the DMRS port group associated with the PTRS are positioned. By doing so, it is possible to avoid the collision between the PTRS and the first RS. The shifted PTRS frequency location may be indicated through at least any one of RRC, MAC-CE, and DCI.

When a frequency location capable of avoiding the collision with the first RS is not found among the frequency locations at which the DMRS ports in the DMRS port group associated with the PTRS are positioned, the PTRS may be positioned at a frequency location capable of avoiding the collision among frequency locations closest to the current PTRS frequency location. That is, the PTRS frequency location may be shifted to a frequency location capable of avoiding the collision where no DMRS port is allocated as described above.

When the PTRS collides with the first RS, the frequency location of the PTRS may be fixed and the time-domain location thereof may be shifted. This method may be applied only when the PTRS is allocated at an interval of at least one OFDM symbol at one frequency.

When the frequency location capable of avoiding the collision with the first RS is not found among the frequency locations at which the DMRS ports in the DMRS port group associated with the PTRS are positioned, if the PTRS is allocated at an interval of at least one OFDM symbol at one frequency, the frequency location of the PTRS may be fixed and the time-domain location thereof may be shifted. On the other hand, when the frequency location capable of avoiding the collision with the first RS is not found among the frequency locations at which the DMRS ports in the DMRS port group associated with the PTRS are positioned, if the PTRS is allocated to all OFDM symbols at one frequency, the frequency location of the PTRS may be shifted to the frequency location capable of avoiding the collision among the frequency locations closest to the current PTRS frequency location.

In addition, shifting methods may be prioritized. For example, shifting in the frequency locations at which the DMRS ports in the DMRS port group may have the highest priority, shifting of the time-domain location may have the second highest priority, and shifting of the frequency-domain location may have the lowest priority as described above.

Device Configuration

Figure 18:
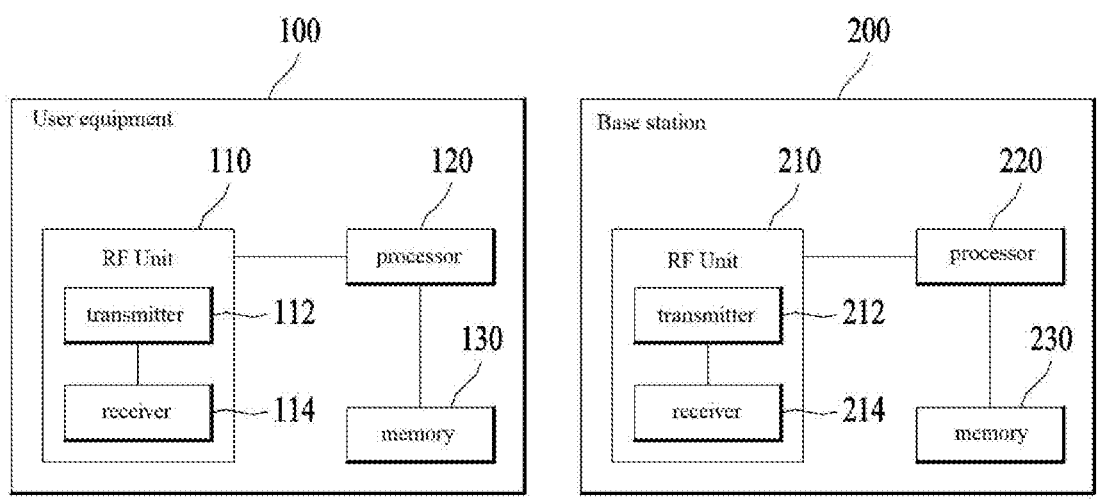
FIG. 18 is a block diagram illustrating the configurations of a user equipment and a base station according to an embodiment of the present disclosure.

FIG. 18 is a block diagram showing the configuration of a user equipment and a base station according to one embodiment of the present disclosure. In FIG. 18, the user equipment 100 and the base station 200 may include radio frequency (RF) units 110 and 210, processors 120 and 220 and memories 130 and 230, respectively. Although a 1:1 communication environment between the user equipment 100 and the base station 200 is shown in FIG. 18, a communication environment may be established between a plurality of user equipment and the base station. In addition, the base station 200 shown in FIG. 18 is applicable to a macro cell base station and a small cell base station.

The RF units 110 and 210 may include transmitters 112 and 212 and receivers 114 and 214, respectively. The transmitter 112 and the receiver 114 of the user equipment 100 are configured to transmit and receive signals to and from the base station 200 and other user equipments and the processor 120 is functionally connected to the transmitter 112 and the receiver 114 to control a process of, at the transmitter 112 and the receiver 114, transmitting and receiving signals to and from other devices. The processor 120 processes a signal to be transmitted, sends the processed signal to the transmitter 112 and processes a signal received by the receiver 114.

If necessary, the processor 120 may store information included in an exchanged message in the memory 130. By this structure, the user equipment 100 may perform the methods of the various embodiments of the present disclosure.

The transmitter 212 and the receiver 214 of the base station 200 are configured to transmit and receive signals to and from another base station and user equipments and the processor 220 are functionally connected to the transmitter 212 and the receiver 214 to control a process of, at the transmitter 212 and the receiver 214, transmitting and receiving signals to and from other devices. The processor 220 processes a signal to be transmitted, sends the processed signal to the transmitter 212 and processes a signal received by the receiver 214. If necessary, the processor 220 may store information included in an exchanged message in the memory 230. By this structure, the base station 200 may perform the methods of the various embodiments of the present disclosure.

The processors 120 and 220 of the user equipment 100 and the base station 200 instruct (for example, control, adjust, or manage) the operations of the user equipment 100 and the base station 200, respectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present disclosure may be called controllers, microcontrollers, microprocessors, microcomputers, etc. The processors 120 and 220 may be implemented by hardware, firmware, software, or a combination thereof.

If the embodiments of the present disclosure are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

In the case of implementation by firmware or software, a method according to each embodiment of the present disclosure can be implemented by modules, procedures, and/or functions for performing the above-explained functions or operations. Software code is stored in the memory unit and is then drivable by the processor. The memory unit is provided within or outside the processor to exchange data with the processor through the various means known to the public.

The detailed description of the preferred embodiments of the present disclosure has been given to enable those skilled in the art to implement and practice the disclosure. Although the disclosure has been described with reference to the preferred embodiments, those skilled in the art will appreciate that various modifications and variations can be made in the present disclosure without departing from the spirit or scope of the disclosure described in the appended claims. Accordingly, the disclosure should not be limited to the embodiments described herein but should be accorded the broadest scope consistent with the principles and novel features disclosed herein. It will be apparent that, although the preferred embodiments have been shown and described above, the present specification is not limited to the above-described specific embodiments, and various modifications and variations can be made by those skilled in the art to which the present disclosure pertains without departing from the gist of the appended claims. Thus, it is intended that the modifications and variations should not be understood independently of the technical spirit or prospect of the present specification.

The embodiments of both the method and device have been described in this document, and if necessary, the descriptions thereof may be complementarily applied.

INDUSTRIAL APPLICABILITY

The above-described embodiments are applicable not only to the 3GPP LTE and LTE-A systems but also to various wireless communication systems including IEEE 802.16x and IEEE 802.11x systems. Further, the proposed methods are applicable to an mmWave communication system using ultra-high frequency band.

The invention claimed is:

1. A method of transmitting a reference signal by a base station in a wireless communication system, the method comprising:
    transmitting configuration information including information on a resource region of a zero power channel state information-reference signal (CSI-RS);
    generating a phase tracking reference signal (PTRS);
    allocating the PTRS to a resource block and
    transmitting the allocated PTRS,
    wherein when a resource region to which the PTRS is allocated collides with the resource region of the zero power CSI-RS within the resource block, the PTRS is not transmitted in a colliding resource region.

2. The method of claim 1, wherein when the resource region to which the PTRS is allocated collides with the resource region of the zero power CSI-RS within the resource block, the PTRS is not allocated to the colliding resource region.

3. The method of claim 1, wherein when the resource region to which the PTRS is allocated collides with the resource region of the zero power CSI-RS within the resource block, the zero power CSI-RS is transmitted in the colliding resource region.

4. The method of claim 1, wherein the configuration information including the information on the resource region of the zero power CSI-RS is transmitted in at least one of radio resource control (RRC) and a downlink control indicator (DCI).

5. A base station for transmitting a reference signal in a wireless communication system, the base station comprising:
 a transmitter configured to transmit a signal; and
 a processor configured to control the transmitter,
 wherein the processor is configured to:
  control the transmitter to transmit configuration information including information on a resource region of a zero power channel state information-reference signal (CSI-RS);
  generate a phase tracking reference signal (PTRS);
  allocate the PTRS to a resource block and transmit the allocated PTRS, and wherein when a resource region to which the PTRS is allocated collides with the resource region of the zero power CSI-RS within the resource block, the PTRS is not transmitted in a colliding resource region.

6. The base station of claim 5, wherein when the resource region to which the PTRS is allocated collides with the resource region of the zero power CSI-RS within the resource block, the PTRS is not allocated to the colliding resource region.

7. The base station of claim 5, wherein when the resource region to which the PTRS is allocated collides with the resource region of the zero power CSI-RS within the resource block, the zero power CSI-RS is transmitted in the colliding resource region.

8. The base station of claim 5, wherein the configuration information including the information on the resource region of the zero power CSI-RS is transmitted in at least one of radio resource control (RRC) and a downlink control indicator (DCI).

* * * * *